United States Patent
Zhao

(10) Patent No.: US 7,698,209 B1
(45) Date of Patent: Apr. 13, 2010

(54) SYSTEM, METHOD, AND COMPUTER PROGRAM PRODUCT FOR DETERMINING RESULTS OF PROGRAMMING LOGIC

(75) Inventor: Tienan Zhao, Rockville, MD (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 771 days.

(21) Appl. No.: 11/354,960

(22) Filed: Feb. 16, 2006

(51) Int. Cl.
*G06Q 40/00* (2006.01)

(52) U.S. Cl. .......................................... 705/37; 705/35

(58) Field of Classification Search .............. 705/35–37
See application file for complete search history.

(56) References Cited

U.S. PATENT DOCUMENTS

2004/0138933 A1* 7/2004 LaComb et al. ................ 705/7
2005/0010453 A1* 1/2005 Terlizzi et al. ................ 705/4

* cited by examiner

*Primary Examiner*—Thu Thao Havan
(74) *Attorney, Agent, or Firm*—Oblon, Spivak, McClelland, Maier & Neustadt, P.C.

(57) ABSTRACT

A method, system, and computer-program product for determining one or more decision steps of a programming logic set executed by a computer. The method comprises steps of: receiving at least one data set; receiving conditional information; tagging one of said one or more data sets to indicate qualification under the conditional information. The tagging includes determining, for each tagging condition element, if the tagging condition element passes or fails, and combining, in accordance with a predefined logic scheme, the results of the individual tagging condition elements from the determining step to further determine whether said data set meets the conditions.

52 Claims, 39 Drawing Sheets

$$\left.\begin{array}{l}
2A \left\{ \begin{array}{l}
\left. \begin{array}{l} \text{If } \{ \quad (\text{condition aa1 is true} \\ \text{and condition aa2 is true} \\ \text{and condition aa3 is true} \\ ...) \end{array} \right\} 1A \\
\left. \begin{array}{l} \text{Or } ( \quad \text{condition ab1 is true} \\ \text{and condition ab2 is true} \\ \text{and condition ab3 is true} \\ ...) \end{array} \right\} 1B \\
\left. \begin{array}{l} \text{Or } ( \quad \text{condition ac1 is true} \\ \text{and condition ac2 is true} \\ \text{and condition ac3 is true} \\ ...)\} \end{array} \right\} 1C
\end{array} \right. \\
2B \left\{ \begin{array}{l}
\left. \begin{array}{l} \text{And } \{ \quad (\text{condition ba1 is true} \\ \text{and condition ba2 is true} \\ \text{and condition ba3 is true} \\ ...) \end{array} \right\} 1D \\
\left. \begin{array}{l} \text{Or } ( \quad \text{condition bb1 is true} \\ \text{and condition bb2 is true} \\ \text{and condition bb3 is true} \\ ...) \end{array} \right\} 1E \\
\left. \begin{array}{l} \text{Or } ( \quad \text{condition bc1 is true} \\ \text{and condition bc2 is true} \\ \text{and condition bc3 is true} \\ ...)\} \end{array} \right\} 1F
\end{array} \right.
\end{array} \right.$$

Exemplary Conditional Information

| AND-GROUP | OR-GROUP | ELEMENT NAME | OPERATORS | ELEMENT VALUE | AND OPERATOR |
|---|---|---|---|---|---|
| AND group 1 | | | | | |
| | OR group 1 (1) | Funding date | less than or equal to | 11/30/2004 | AND |
| | | master number | Equal to | 123ABC | AND |
| | OR group 2 (1) | Funding date | less than or equal to | 5/31/2003 | AND |
| | | Mortgage special characteristics | Is not one of | 117, 347 | AND |
| | | master number | Equal to | 456ABC | |
| AND group 2 | | | | | |
| | OR group 1 (2) | Offer product code | Is not one of | 002, 800, 865, 866, 869 | AND |
| | | Loan feature code | Is not one of | J, K | AND |
| | OR group 2 (2) | Risk class | Is one of | 08, 09 | AND |
| | | Risk class source | Is one of | 06, 07, 08 | |

Fig. 12B

Exemplary data set representative of a loan document

| Funding date | 11/30/2004 |
|---|---|
| master number | 123ABC |
| Loan to value ratio | 85% |
| Annual percentage | 6.25 |

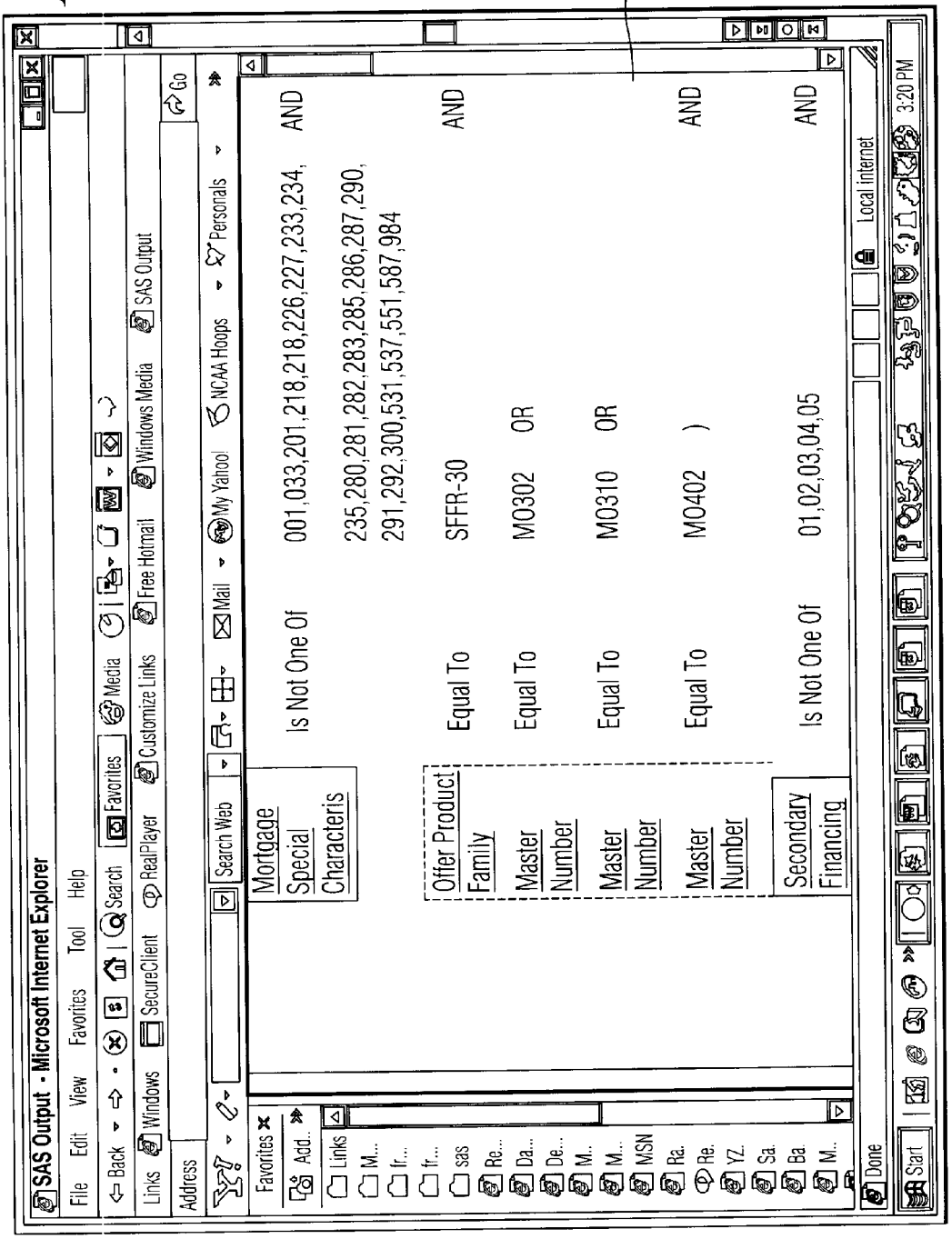

Fig. 21B

| | | | |
|---|---|---|---|
| Offer Product Code | Is Not One Of | 421,461,594,596,838,839,840,841 | AND 413 |
| Detail Loan Product | Is Not One Of | 022,023,099,122,123,124,125,126,127, 128,144,153,162,171,237,238,239,240, 447,448,449,450,922,A25,A26,A27,B21, B22,B23,D19,D20,D21,D22,D23,D24,D25, D26,D27,D28,D29,D30,D31,D32,D33,D34, D35,D36,D37,D38,D39,D40,D41,D42,D43, D44,D45,D46,D47,D48,D49,D50,D51,D52, D53,D54,D55,D56,D57,D58,D59,D60,D61, D62,D63,D64,D65,D66 | AND A01 |
| Funding Date | Greater Than or Equal To | 03/01/2003 | AND 02/10/2005 |

210

SYSTEM, METHOD, AND COMPUTER PROGRAM PRODUCT FOR DETERMINING RESULTS OF PROGRAMMING LOGIC

BACKGROUND OF THE INVENTION

1. Field of the Invention

The invention relates to a system, method, and computer program product for determining decision steps of a programming logic set executed by a computer. Particularly, the present invention provides users with the details of how a pass/fail decision was made in a programming logic set executed by a computer.

2. Description of the Related Art

The cumulative effect of many investment decisions over a variety of assets and/or investments ultimately defines whether a portfolio of assets is successful. Poor investment decisions result in a loss of capital (e.g., a reduction in the value of an asset or portfolio of assets) or a lower rate of return. A financial institution's business model relies on the assumption that an acceptable rate of return can be made (e.g., a bank, mutual fund, hedge fund, real estate syndicate etc.). A poor investment decision substantially and negatively affects the financial institution's profitability and has a significant and lasting negative effect on the economic viability of the financial institution.

One way to minimize the risk of loss associated with investment decisions is to obtain insurance. In certain instances, a purchaser or holder of a large number of similar investment vehicles (such as mortgages or asset backed securities) may enter into an agreement with an insurer. The agreement will include the conditions the investment vehicle must satisfy (or pass) in order to be insured by the insurer. For example, if the investment vehicle is a mortgage, a mortgage insurer might require that the mortgage have a loan to value ratio of more than 80% before insuring the mortgage. The loan to value ratio is only an exemplary condition that may be imposed by a mortgage insurer before insuring a mortgage. Other exemplary conditions may involve the interest rate, the term of the loan, or funding date. The conditions for insurance imposed by a mortgage insurer can be complex, and it is time consuming to analyze the mortgages individually by comparing them to the constraints imposed by the mortgage insurer.

Conventionally, computers have been used to compare data representing provisions of the investment vehicle (i.e., a mortgage) to the conditions of the insurer. Conventional computer applications interface with the computer to check through true or false (e.g., pass/fail) conditions to make a decision of whether an investment vehicle satisfies (e.g., passes) the conditions imposed under an agreement with the insurer.

With respect to the computer application, the conditions imposed by the insurer can be programmatically organized into a program logic set that contains 2 groups in 3 levels. The first level is an AND-group level. The second level is an OR-group level. The third level is an individual condition level. Each AND-group can have more than one OR-group within it. Each OR-group can have more than one individual condition within it. The number of AND-groups, OR-groups and individual conditions determine the level complexity of the task the computer application is processing.

An AND-group condition is considered to be true if at least one of all OR-groups within the AND-group is true. An OR-group is considered true if all individual conditions within the OR-group are true. If all AND-groups are true, the whole set of logic is considered a pass. Otherwise, the logic set is considered a fail. FIG. 1 shows an exemplary structure of programming logic set.

As shown in FIG. 1, there are two AND-groups 2A and 2B. Within AND-group 2A, there are three OR-groups 1A, 1B, and 1C. Within AND-group 2B, there are three OR-groups, 1D, 1E, and 1F. Within each OR-group, there are shown three individual conditions. When a computer is executing the program logic, it will check through each AND-group. Inside each AND-group, the computer will check each OR-Group by order. If one of the OR-groups is satisfied, that means all individual conditions are satisfied in the OR-group. For example, if OR-group 1A is satisfied (i.e., all individual conditions within 1A are satisfied), then AND-group 2A is also satisfied. Thus, the computer will not check the rest of the OR-groups (1B or 1C) within AND-group 2A. The conventional technique is performed this way because it uses fewer computer resources and improves computer efficiency. Efficiency is improved because the computer does not check programming conditions that do not affect the pass or fail decision, regardless if they are satisfied.

For example, if OR-group 1A passes and OR-group 1B passes, the AND-group 2A passes. If OR-group 1A passes and OR-group 1B fails, the AND-group 2A still passes. Once the computer determines that AND-group 2A passes, the results of OR-group 1B are irrelevant. Thus, the conventional technique skips OR-group 1B and any other irrelevant processing.

The conventional approach does not allow a user to question the results of the programming logic. For example, if the computer determined that a loan did not pass or satisfy the conditions imposed under an agreement with the mortgage insurer, a user of the conventional approach would not know the reason why the computer determined that a loan did not pass or satisfy the conditions. The conventional approach provides only the overall result. In many cases, a user needs to know not only the result of the program logic, but also the details of the pass or fail of each AND-group, OR-group, and even the individual conditions inside the OR-groups. Conventional programming logic is not able to effectively provide detailed decision-making information.

Using the conventional technique, if a user questioned the results of the programming logic, the user would have to go through the programming logic set manually to see which conditions caused the data representations of the loan to fail. This is a very time consuming process where mistakes can be easily made.

There are many reasons for users to question the processing results and for users to need the detailed information about how the pass/fail decision was made. For example, if the computing process does not match the user's expectations, this might indicate that the programming logic is incorrect, or that a human error occurred such as information having been input into the computer incorrectly.

The present inventor has recognized a need for a new programming approach to deal with a situation where a user needs to know the details of how pass/fail decisions were made after the programming logic set is executed by the computer. Furthermore, there is also a need for a computer capable of showing the role each individual condition plays in making pass/fail decisions.

Furthermore, in the context of the example discussed above involving mortgages, a new programming approach would help individual loan holders by reducing processing costs of the mortgage guarantors and mortgage insurers.

SUMMARY OF THE INVENTION

Accordingly, to address the above-identified and other problems of conventional computer analysis, one object of the invention is to provide a system, method, and computer program product for determining one or more decision steps of a programming logic by a computer. In one aspect of the invention, a method for determining all decision steps of a programming logic set executed by a computer comprises steps of: receiving at least one data set; receiving conditional information; and tagging one of said one or more data sets to indicate qualification under the conditional information. The step of tagging includes determining, for each tagging condition element, if the tagging condition element passes or fails, and combining, in accordance with a predefined logic scheme, the results of the individual tagging condition elements from the determining step to further determine whether said data set meets the conditions.

In another aspect of the invention, instead of the computer performing an analysis proceeding in the direction of AND-group to OR-group, and then to each individual condition, the present invention checks each individual condition to see if the condition passes or fails. Based on the pass or fail of each individual condition, the computer decides pass or fail for each OR-group. Based on the pass or fail of each OR-group, the computer determines the pass or fail of each AND-group. The final pass/fail decision can be made from the pass or fail of the AND-groups. Since the approach of the present invention analyzes each individual condition, then each OR-group, and then each AND-group, a full picture of the complete program logic set can be determined and displayed to a user.

In another aspect of the invention, a computer-implemented method determines whether one or more loans meets one or more requirements of an agreement. The method comprises steps of receiving one or more data sets representative of the one or more loans; receiving data representative of one or more conditions that must be satisfied by a given loan in order for the loan to qualify under the requirements of the agreement; tagging one of said one or more loans to indicate qualification under the requirements of the agreement. The step of tagging includes determining, for each tagging condition element, if the tagging condition element passes or fails, and combining, in accordance with a predefined logic scheme, the results of the individual tagging condition elements from the determining step to further determine whether said loan meets the conditions for qualification under the requirements of the agreement.

The above summary addresses only selected aspects of the invention and should not be construed as a comprehensive description of all aspects of the invention, especially not at the exclusion of the teachings in the specification, claims, and figures provided herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exemplary structure of a programming logic set;

FIGS. 12A and 12B show an exemplary embodiment of the programming logic set including tagging condition elements, and an exemplary embodiment of a data set representative of a loan document;

FIG. 14 shows an exemplary graphical user interface after a preliminary step of selecting a second tagging condition element;

FIGS. 21A-21C shows an exemplary graphical user interface showing tagging results;

DETAILED DESCRIPTION OF THE INVENTION

Figure 2:
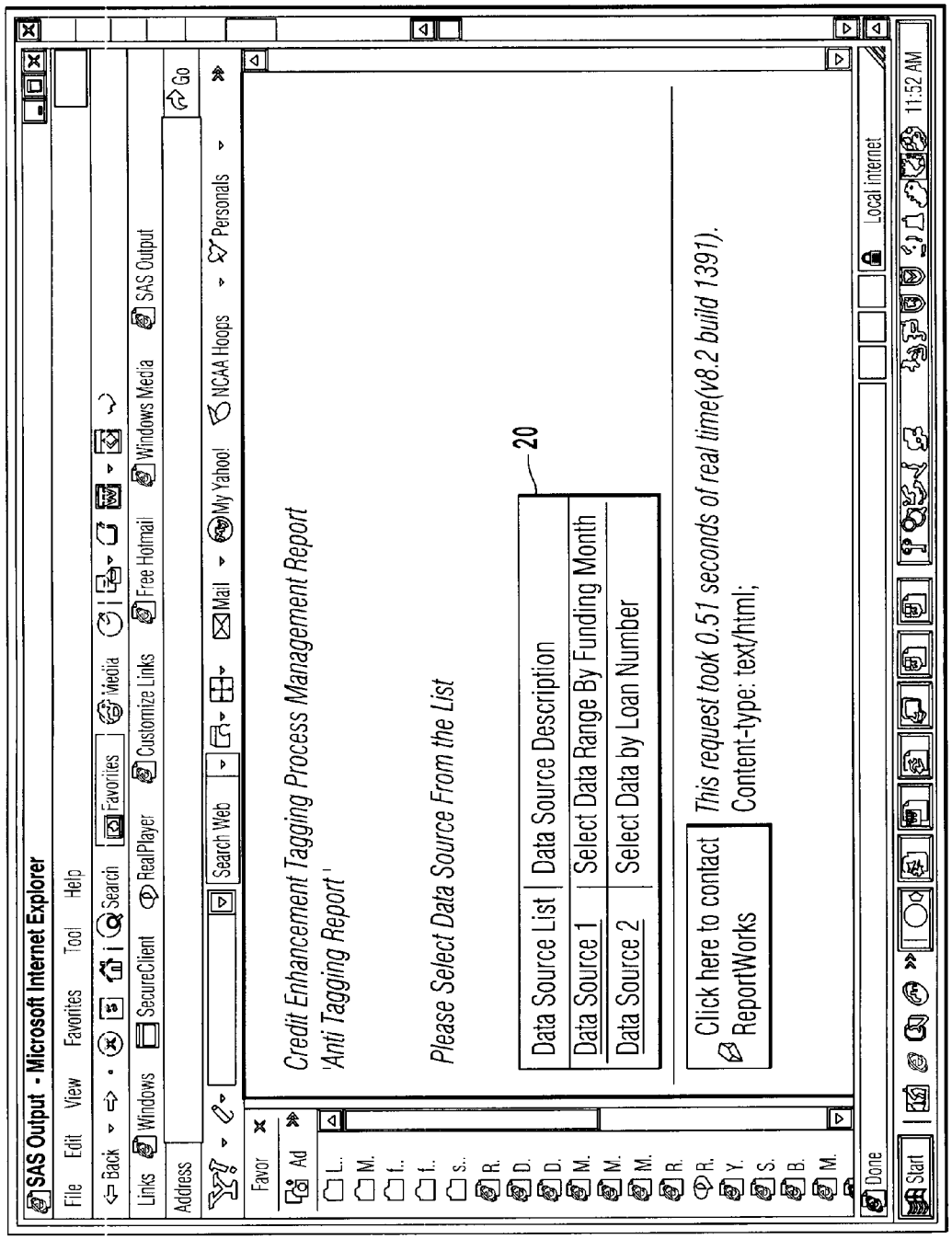
FIG. 2 is an exemplary graphical user interface used in a non-limiting embodiment of the invention.

Referring now to the drawings, like reference numerals designate identical or corresponding parts throughout the several views.

The present invention is discussed below in the context of the mortgage industry. However, this is only one exemplary embodiment and the present invention envisioned to work for services where detailed information about a programming logic set is required. For example, the present invention has applicability not only to mortgages, but to other financial products as well.

For example, the method may be used not only for determining the decision steps as they relate to risk-sharing between two parties engaged in the mortgage industry, but may also be used for determining the decision steps in agreements between parties engaged in profit sharing, or the sharing of any other business resource including market share for example.

In an exemplary business model, Company A guarantees a mortgage. With each mortgage, there is a risk of default. If a borrower defaults on a mortgage that Company A guarantees, Company A will owe the balance of the mortgage to the borrower's lender. To minimize Company A's risk of loss, Company A may employ a credit enhancement (CE) program that enables Company A to share the risk of the mortgage default with a mortgage insurance company (MI). Company A and the MI enter into one or more agreements, with each agreement including prerequisite conditions that must be satisfied before the MI will insure mortgage. Under each agreement, Company A and the MI agree upon (1) certain characteristics for mortgages to be qualified in the risk sharing program; and (2) the actions to be taken by Company A and the MI when the mortgage is in default. Either Company A or the MI (or possibly both, depending upon the agreement) have the responsibility to determine which mortgages qualify for the risk sharing agreement (i.e., satisfy the agreement between Company A and the MI by passing the conditions imposed by the MI).

A CE manager is a software application used to tag a mortgage. Tagging a mortgage is the process of selecting loans that qualify for the risk sharing agreement. When a mortgage is tagged, the mortgage is selected to be insured by the MI under the risk sharing agreement. For the CE manager to tag a loan, loan characteristics (such as loan term, interest rate, loan to value ratio, or any other provisions in the mortgage document) are entered into a computer system as a data set, and are stored in a database. Also, conditional information, obtained from the agreement, is converted into computer readable form, organized into a computer program logic set, and stored in a database. The CE manager determines if a loan should be tagged by receiving the data set and the programming logic set. Data sets that satisfy or pass the conditional information correspond to mortgages that qualify for the risk sharing agreement, and are tagged.

Very often, after the CE manager completes the tagging process, Company A or the MI may question the results. For example, Company A wants to know why a particular mortgage was not tagged.

To determine why a loan failed to be tagged, an anti-tagging report is generated. The anti-tagging report displays one or more decision steps of a programming logic set that explain why a mortgage was not tagged. In one embodiment, the anti-tagging report is generated from a web based interactive reporting system built on ReportWorks™ However, other decision making and data integrating platforms may be used.

The anti-tagging report creates an html version of an obligation/term version report. The obligation/term version report is a GUI for a user to communicate with the system interactively, wherein the system reports the results of tagging/anti-tagging.

FIG. 2 shows an exemplary graphical user interface (GUI) for an exemplary software application that generates an anti-tagging report. The GUI displays an html interface 20 that allows a user to select either data source 1 or data source 2. Data source 1 and data source 2 represent different sources for identifying mortgages or data sets to be analyzed.

Figure 3:
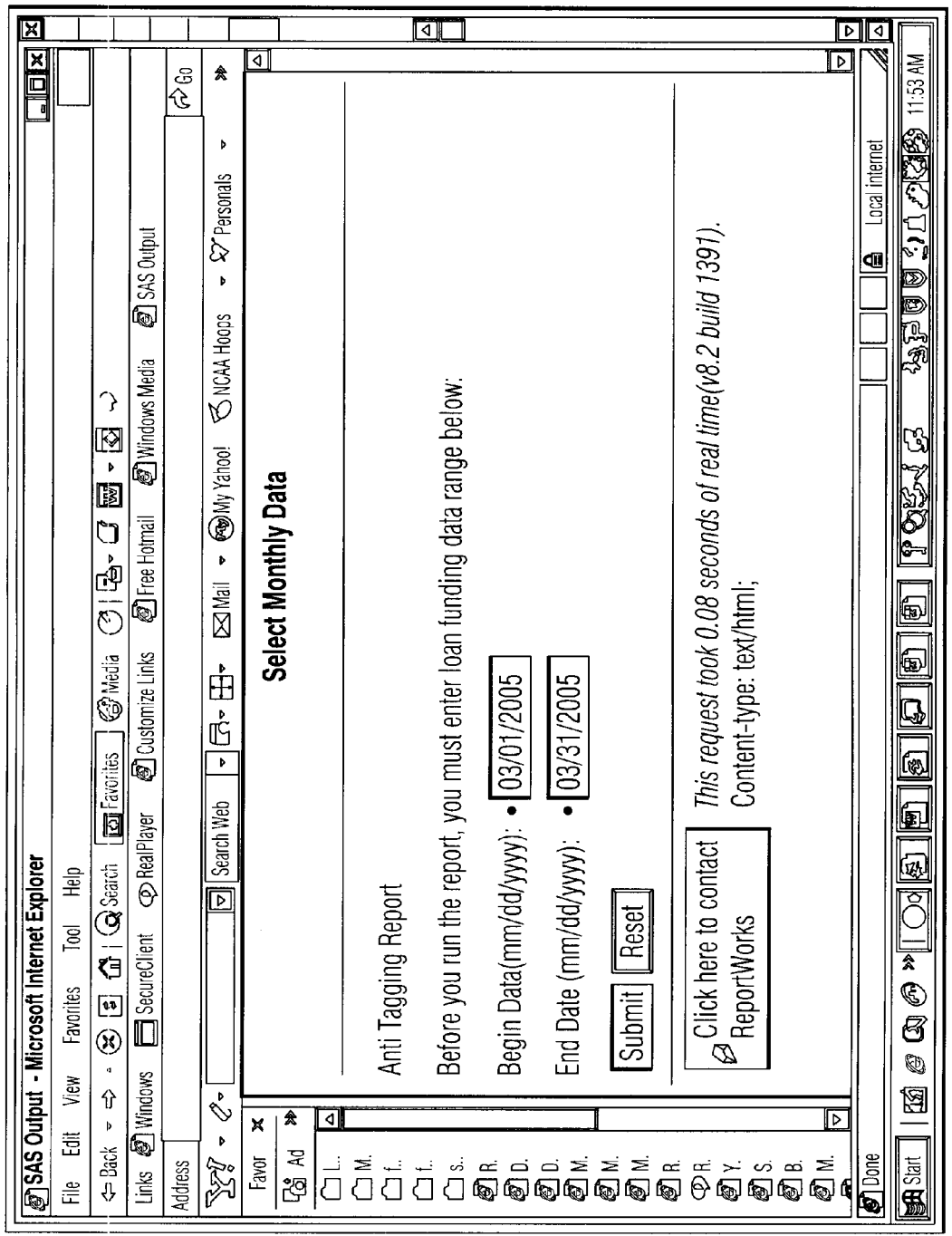
FIG. 3 is another exemplary graphical user interface used in a non-limiting embodiment of the invention.

For example, a user selects data source 1 if the user wants the system to receive data sets by date range. Then the system will display the GUI shown in FIG. 3, which shows a GUI that allows users to select loans by date range.

If the user wants the system to receive data sets by loan numbers, the user selects data source 2. Then the system would display the GUI shown in FIG. 4, which shows a GUI that allows users to select loans by loan number. The selection of data source 2 will be described later.

The term "data set" as used herein indicates information. This information may be taken from a mortgage document. However, "data set" is not limited to information from a mortgage document, but may be information received from any document. Furthermore, "data set" may include information from forms, such as Freddie Mac form 11, Freddie Mac form 16, and Mortgage Industry Standards Maintenance Organization (MISMO) documents. The term "receives" as used herein indicates acquiring possession. A system may receive data by downloading it from a server or remote location, loading it from an internal hard disk or memory (ROM or RAM), or through user input through a keyboard, mouse, other computer input device.

Figure 5:
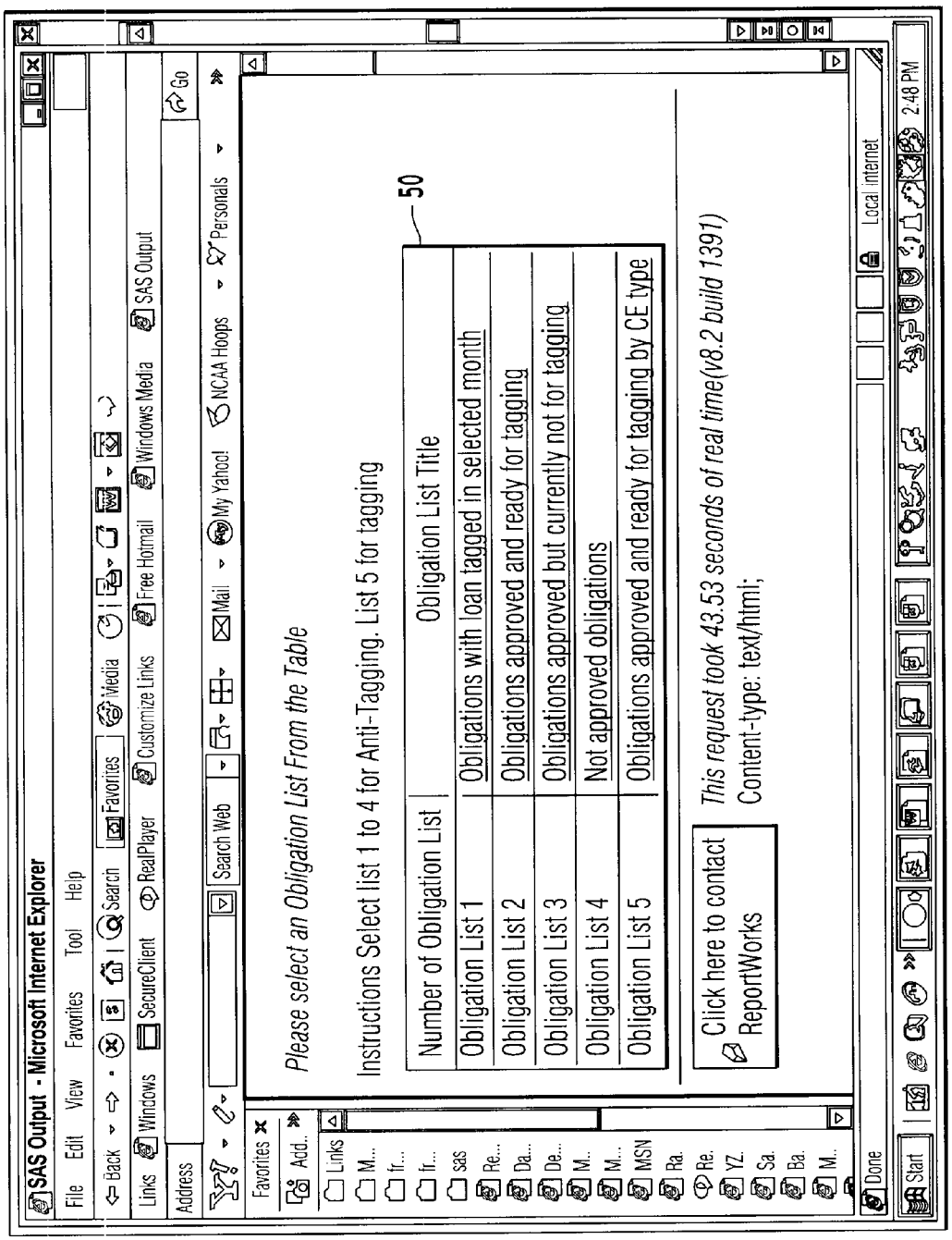
FIG. 5 is an exemplary graphical user interface displaying obligation lists for a non-limiting embodiment of the invention.

Using data source 1, the system will collect data corresponding to the selected loans. After the data corresponding to the selected loans is collected, the system displays the GUI in FIG. 5. FIG. 5 displays five obligation lists in table 50. A user may select one of these obligation lists to determine the conditions the selected loans will be compared to.

The term "table" as used herein indicates a list or arrangement of words, numbers, symbols, or signs. The tables shown throughout the figures are only exemplary embodiments of a table. As known to people of ordinary skill in the art, data may be organized and/or displayed in a variety of ways.

Figure 6:
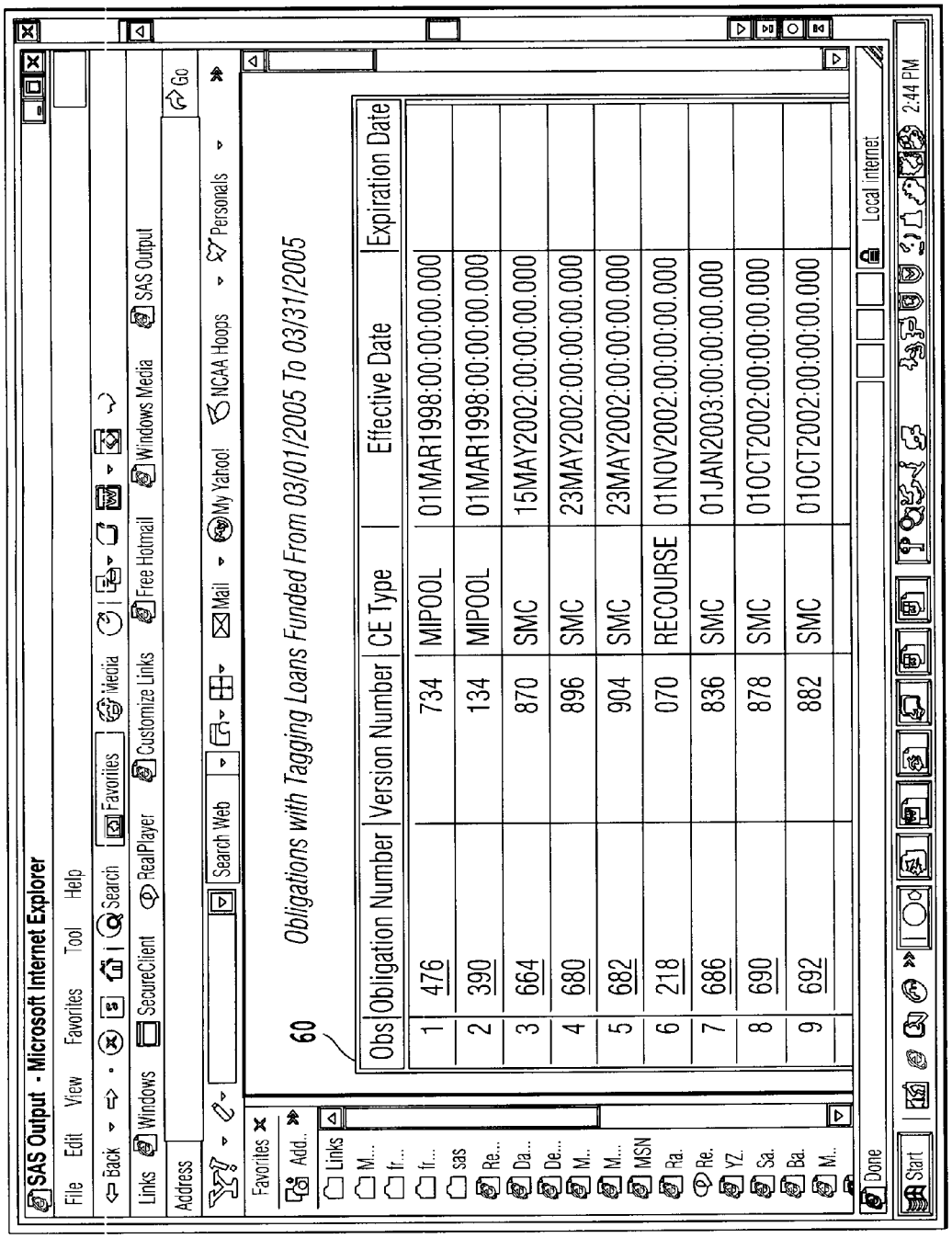
FIG. 6 is an exemplary graphical user interface displaying obligations with tagged loans for a non-limiting embodiment of the invention.

If obligation list 1 is selected, the computer matches loans selected by the user to tagged loans. For all matched loans, the computer identifies their obligation numbers and then matches those obligation numbers to their latest version number, CE type, effective date, and expiration date. The system displays the results in html interface 60 shown in FIG. 6.

Figure 7:
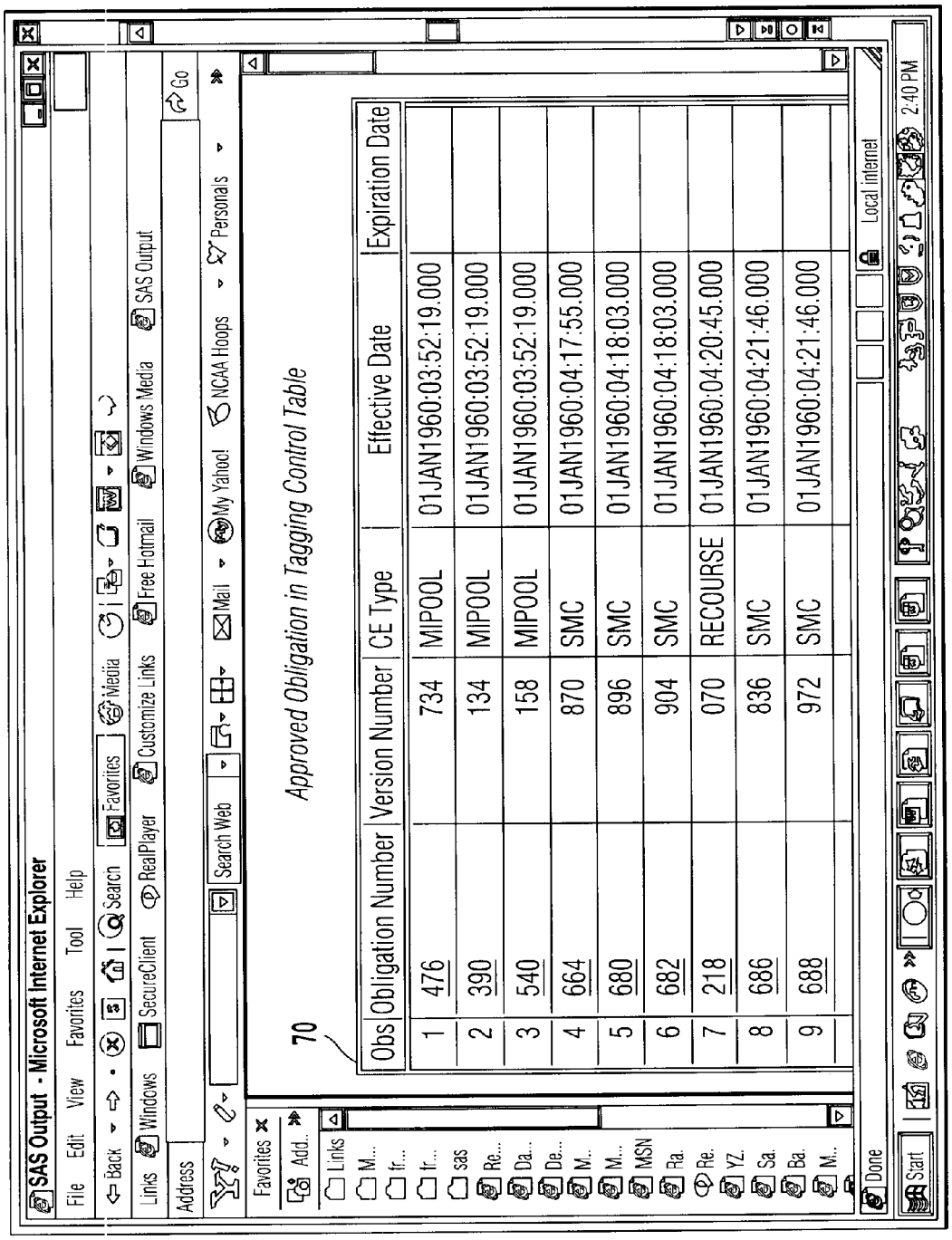
FIG. 7 is an exemplary graphical user interface displaying approved obligations in a tagging control table for a non-limiting embodiment of the invention.

If obligation list 2 is selected, the computer displays the GUI shown in FIG. 7 with table 70. The obligations shown in table 70 are obligations that have been approved and are ready for tagging.

Figure 8:
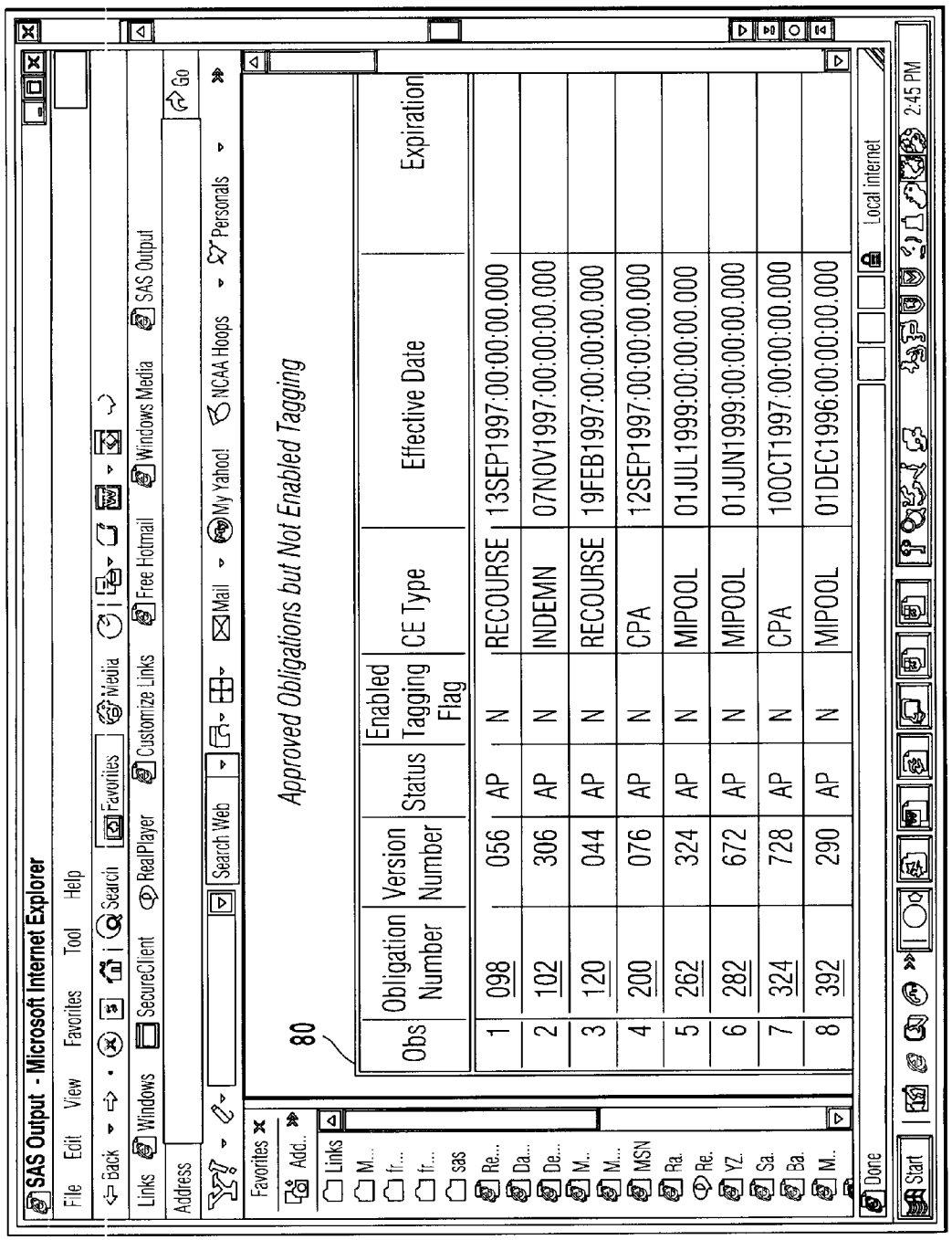
FIG. 8 is an exemplary graphical user interface displaying approved obligations but not enabled for tagging, for a non-limiting embodiment of the invention.

If obligation list 3 is selected, the computer displays the GUI shown in FIG. 8. The obligations shown in table 80 are obligations that have been approved, but are not ready for tagging.

Figure 9:
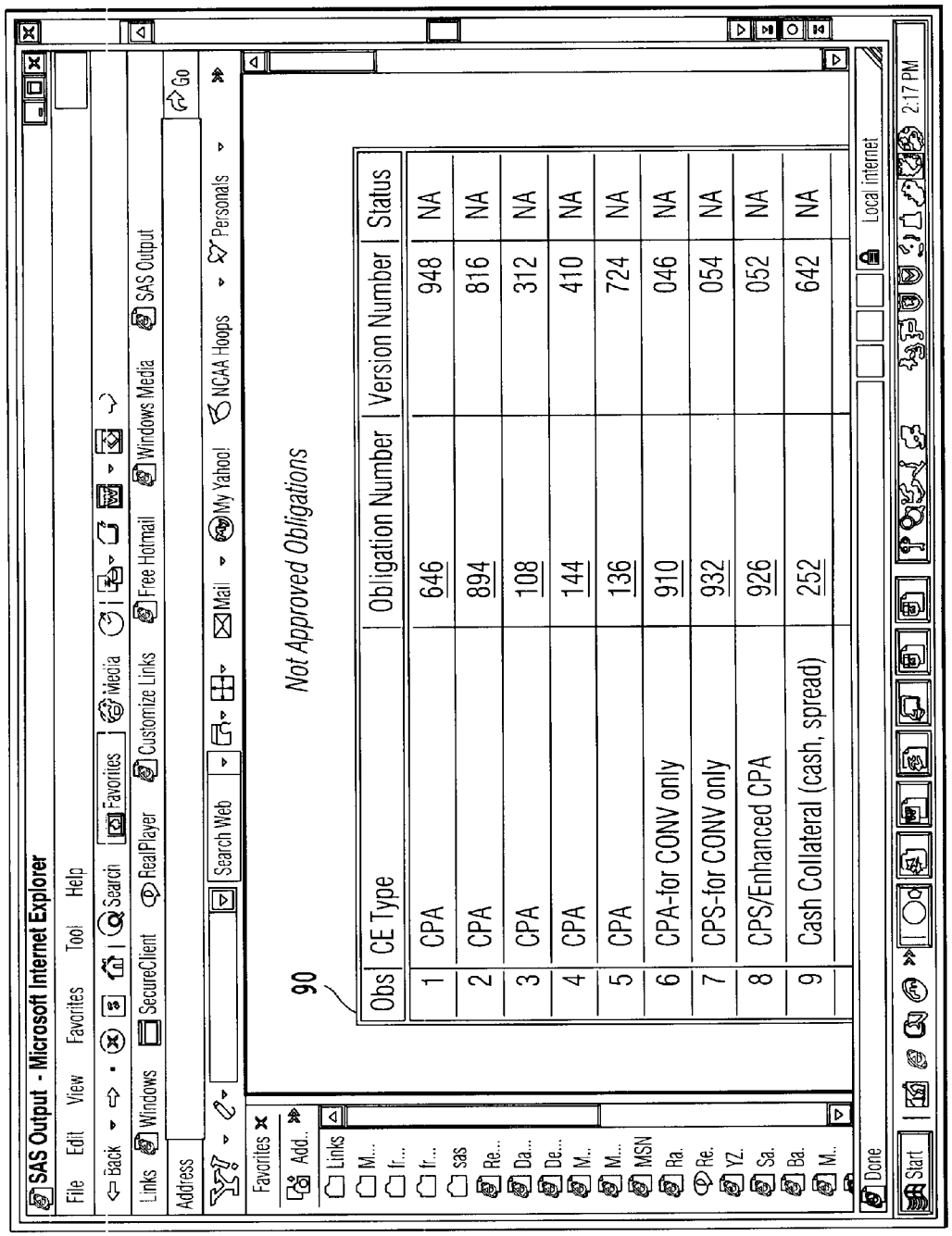
FIG. 9 is an exemplary graphical user interface displaying obligations that are not approved.

If obligation list 4 is selected, the computer displays the GUI shown in FIG. 9. The obligations shown in table 90 are obligations that have not been approved.

Figure 10:
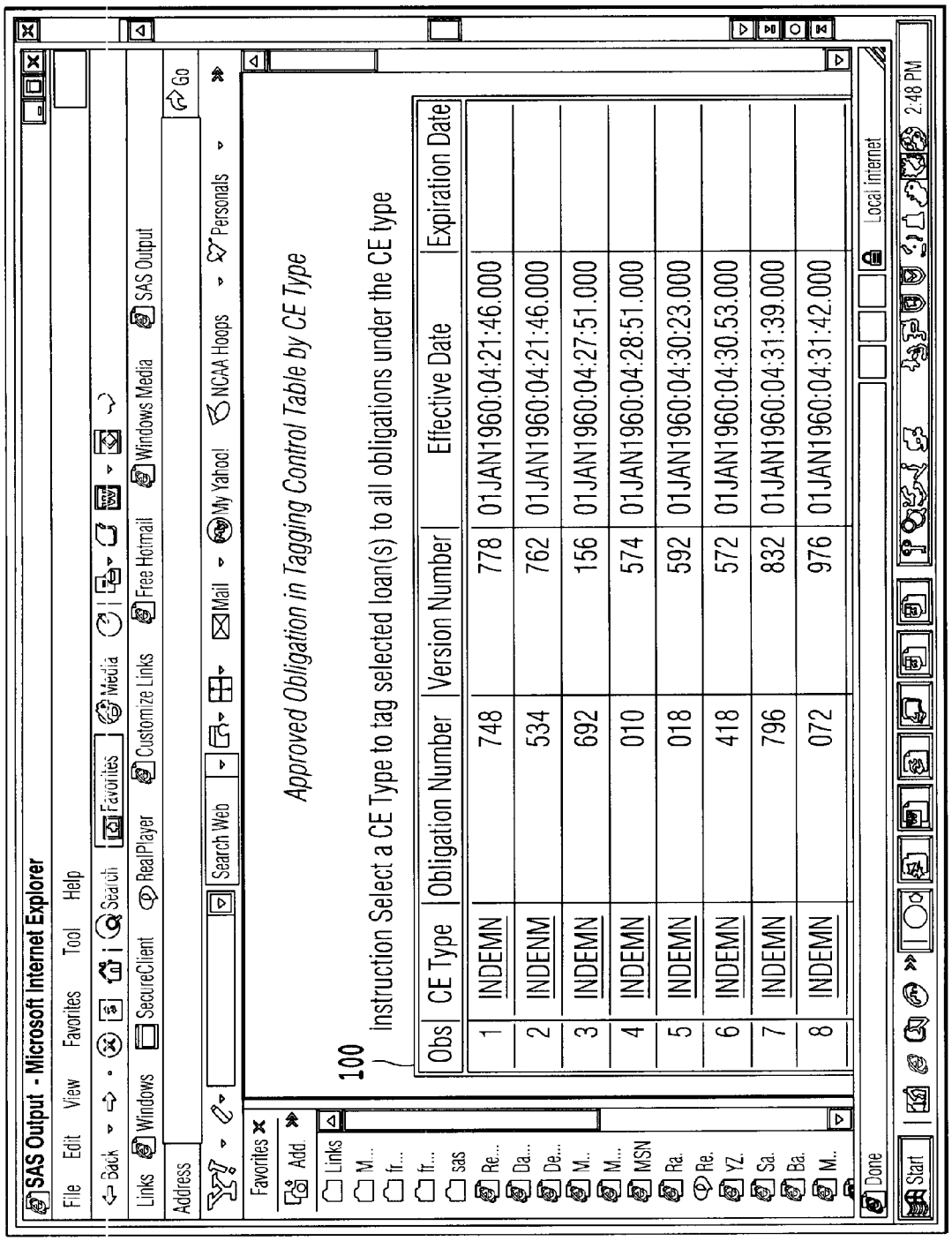
FIG. 10 is an exemplary graphical user interface displaying approved obligations in the tagging control table.

If obligation list 5 is selected, the computer displays the GUI shown in FIG. 10. The obligations shown in table 100 are approved obligations ready for tagging, organized by CE type.

After a user selects an obligation number from obligation list 1 to 4 (obligation list 5 will be discussed later), the system creates a table which displays a table with a visual representation of the logical constraints imposed by the agreement with the mortgage insurer.

Figure 11A:
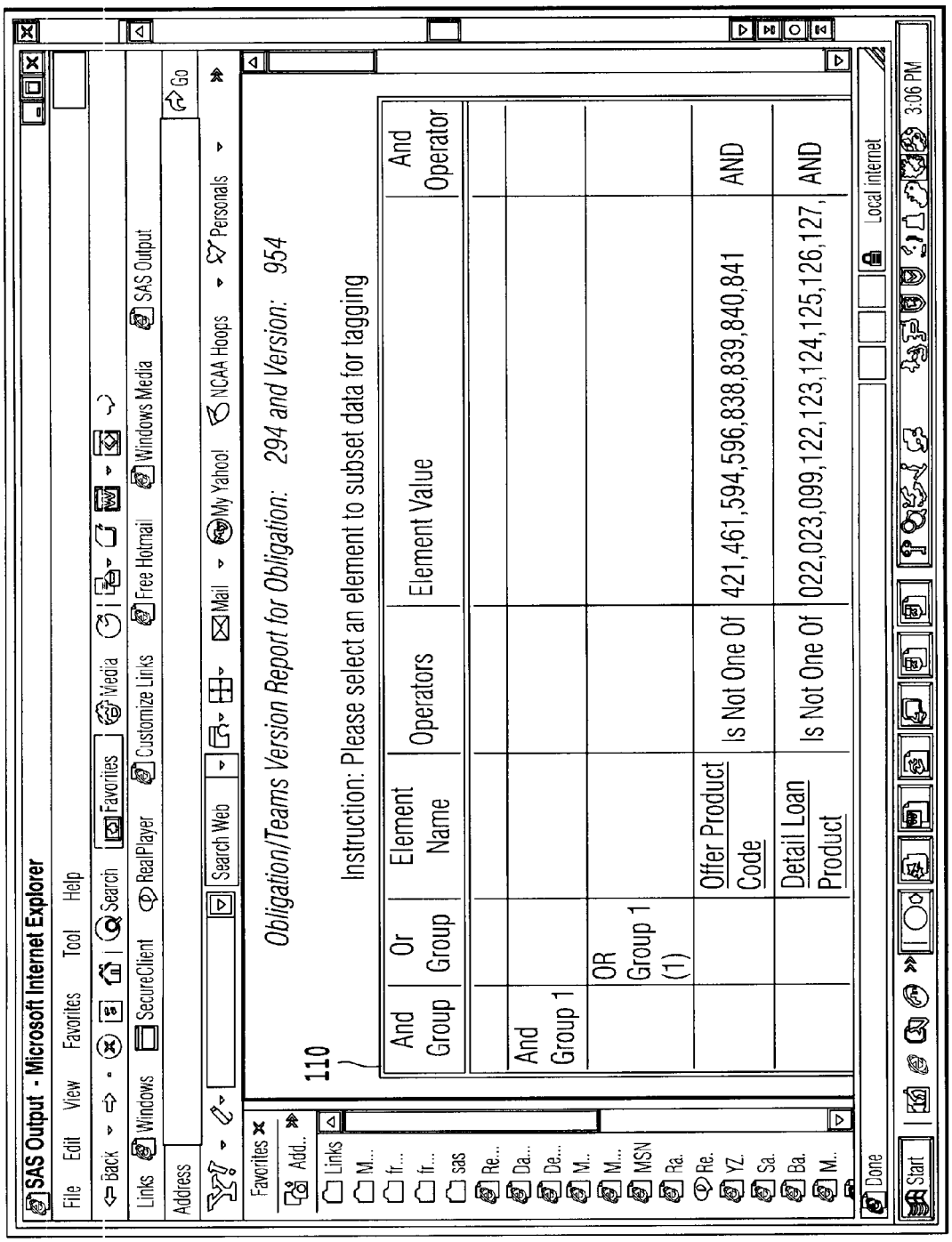
FIGS. 11A and 11B is an exemplary graphical user interface displaying an obligation/term version report.
Figure 11B:
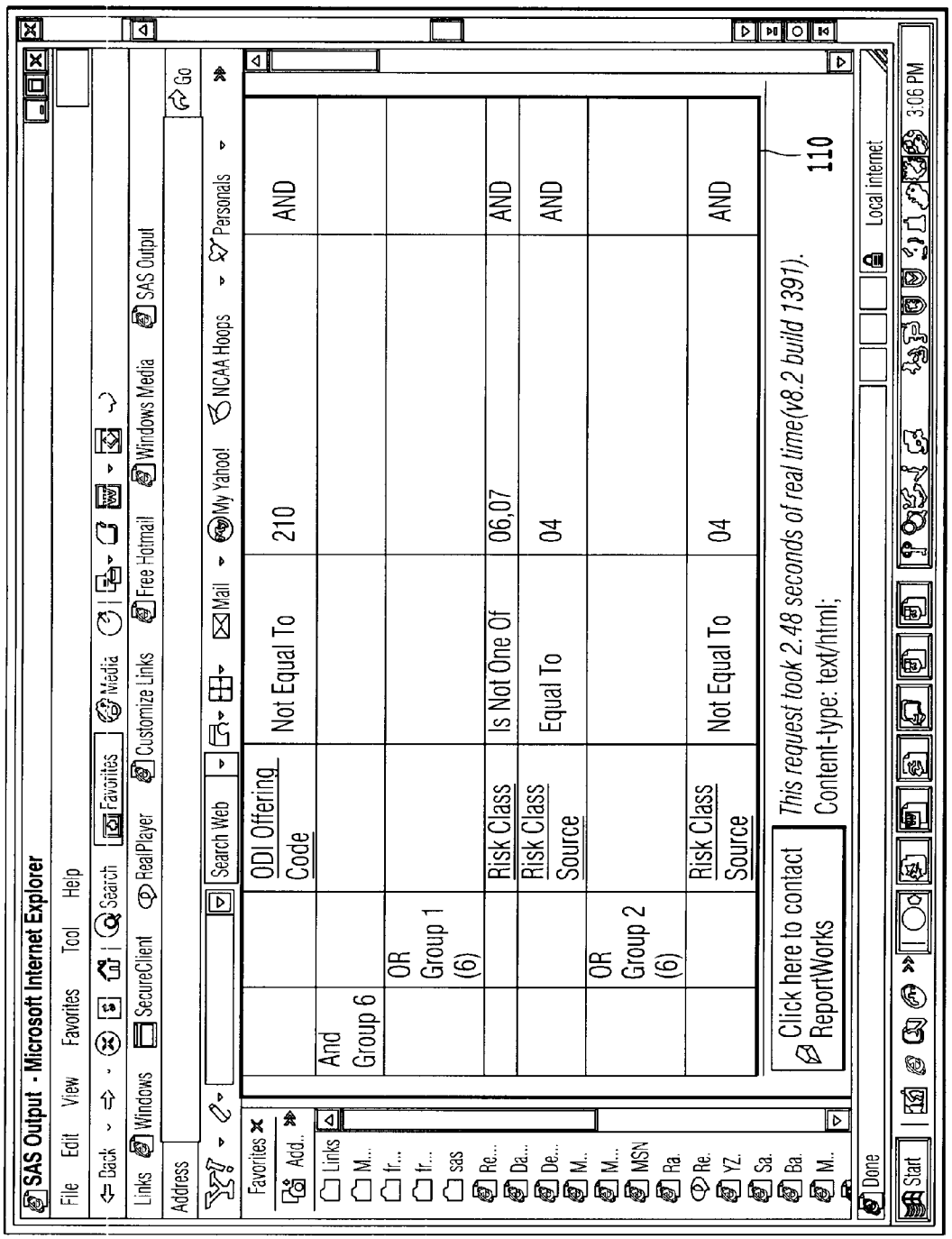

FIGS. 11A and 11B show an exemplary obligation/terms version report for obligation 294, version 954 in the form of table 110. The obligation/terms version report shows the AND-groups, OR-groups, and individual conditions that form the programming logic set. The source of this information is the agreement between Company A and the MI. Further explanation of the obligation/terms version report is made by reference to FIGS. 12A and 12B.

FIG. 12A shows an exemplary display of an html interface of conditional information, including logical constraints imposed by the MI, included in an obligation/terms version report. Under the AND-group column, there are two AND-groups, AND-group 1 and AND-group 2. AND-group 1 includes two OR-groups, OR-group 1 (1) and OR-group 2 (1) (the number in parentheses identifies which AND-group the OR-group is with in). OR-group 1 (1) includes two individual conditions, funding date and master number. The table also displays the operator, an element value, and an AND operator. According to FIG. 12A, for OR-group 1 (1) to pass, the funding date must be less than or equal to Nov. 30, 2004, and the master number must be equal to 123ABC. As indicated by the AND OPERATOR, both of the two individual conditions must be satisfied (i.e., pass or be true) for the OR-group 1 (1) to pass.

Figure 13A:
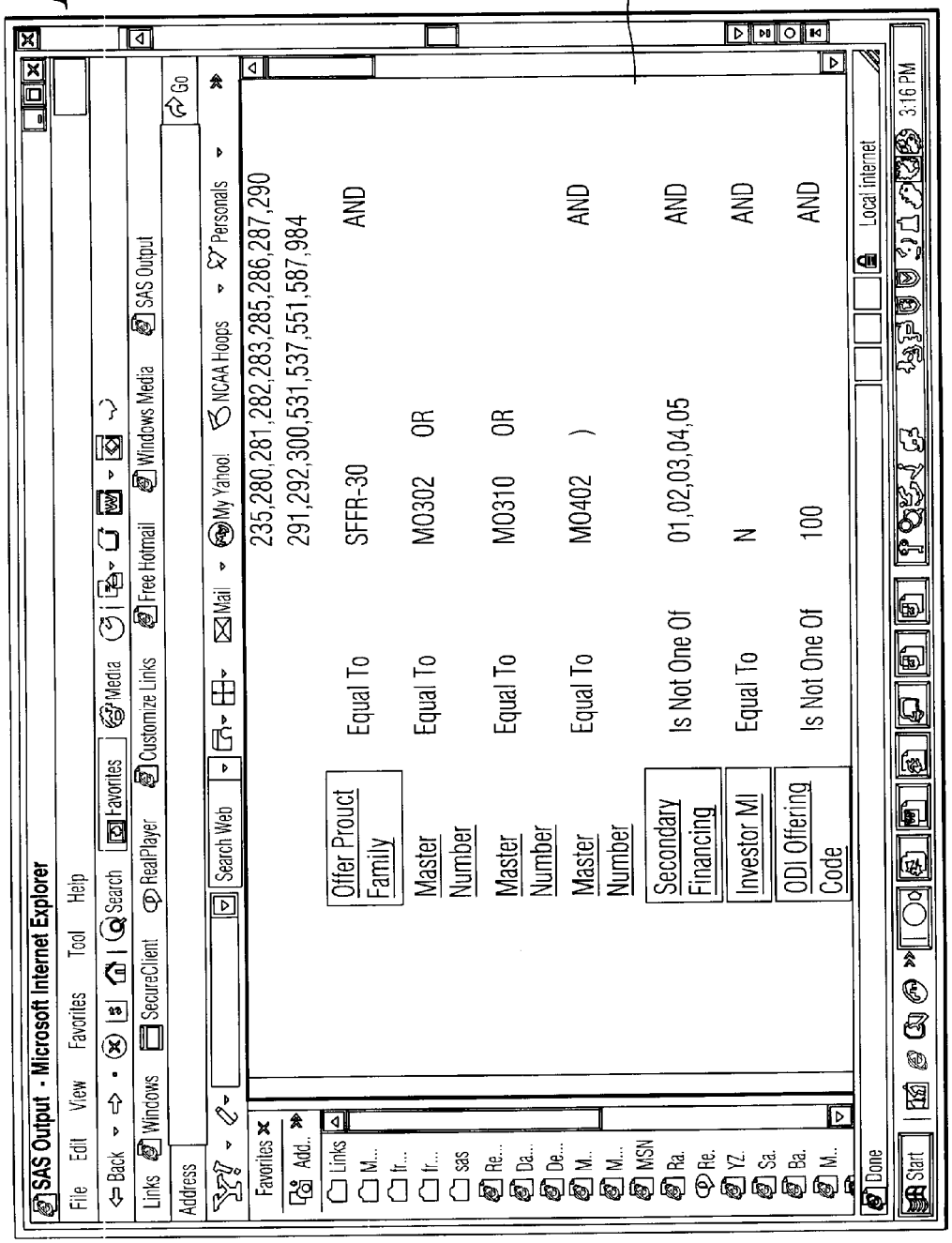
FIGS. 13A and 13B show an exemplary graphical user interface after a preliminary step of selecting a tagging condition element, for a non-limiting embodiment of the claimed invention.

The ELEMENT NAME category includes html enabled tagging condition elements. After a user clicks on any tagging condition element (a preliminary selection), the system dynamically subdivides the previously selected data sets (the loan data received through the GUI of FIG. 3) by selecting only loans that meet the tagging condition element selected by the user. As shown in FIG. 13A, the system redisplays the obligation/terms version report with coloring. Selected tagging condition elements are colored yellow, and non-selected tagging condition elements are colored orange. In the example shown in FIG. 13A, table 130 shows that master number is the selected tagging condition element (and has light background corresponding to yellow) and offer product code, secondary financing, investor MI, and ODI offering code are non-selected tagging condition elements (and have darker backgrounds corresponding to orange).

Figure 13B:
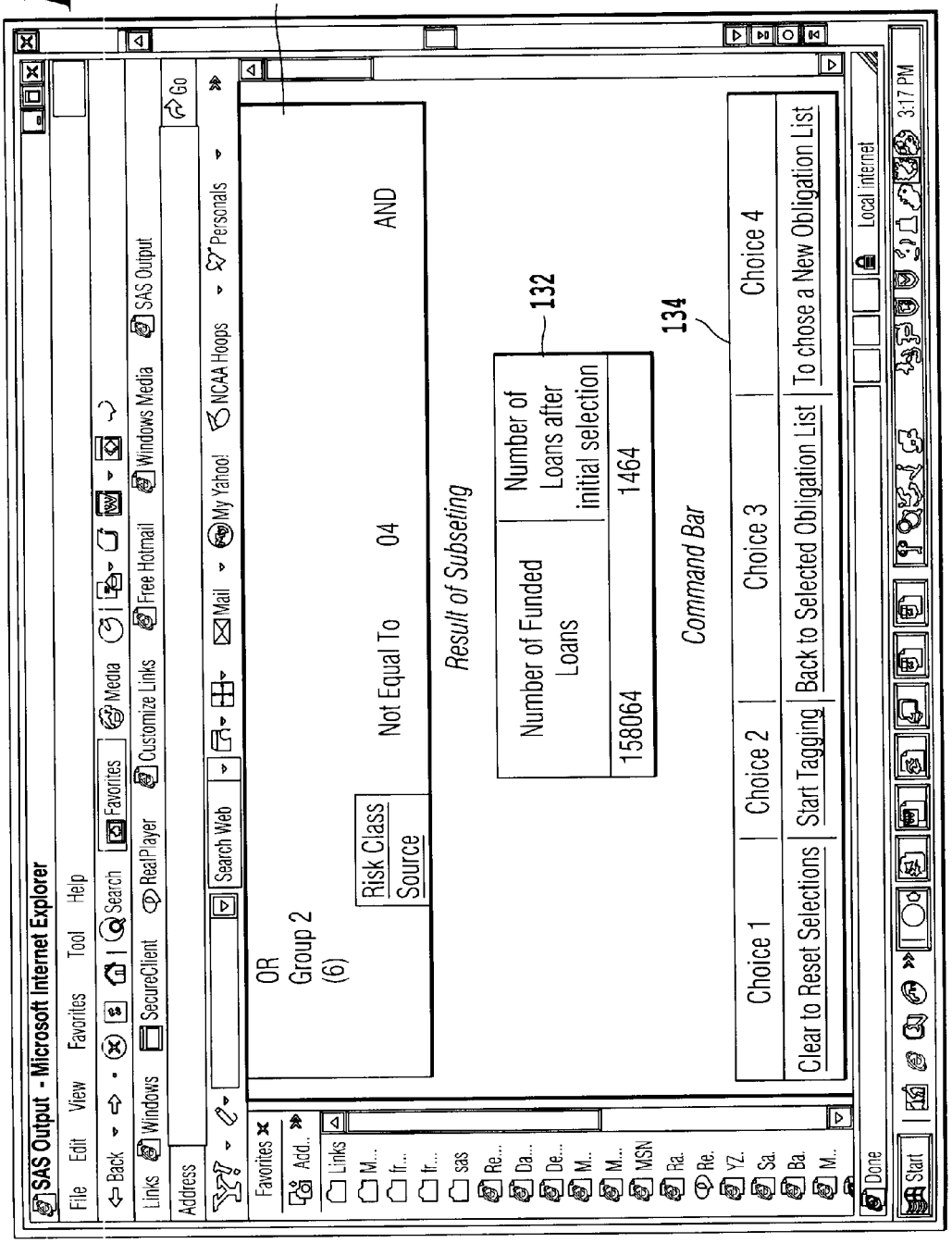

FIG. 13B shows the bottom of the redisplayed obligation/term version report, table 132 includes a display of the number of loans funded, and the number of loans after the initial selection of the master number tagging condition element. According to table 132, 158,064 loans were funded in the time period selected using the GUI in FIG. 3, and 1,464 of those loans have master numbers equal to those displayed in FIG. 13A. The system also generates command bar 134 configured to allow the user to choose a next action. The user can continue sub-dividing the loan data by clicking on another tagging condition element in table 130. As shown in table 140 of FIG. 14, "offer product family" tagging condition element has been clicked, and "offer product family" tagging condition element is now colored yellow (the lighter background).

On command bar 134, shown in FIG. 13B, the user can select choice 1 on the command bar to reset the system to a point shown in FIG. 11A (i.e., before selecting any tagging condition elements).

If the user is satisfied with the preliminary selections, the user selects choice 2 from command bar 134 to start the tagging process. During the tagging process, the system compares data from the loan documents to the conditions of the risk sharing agreement as depicted in FIG. 12A. A risk sharing agreement is only an exemplary agreement. Any agreement that imposed one or more conditions could be used with the present invention.

The tagging process includes, determining, for each tagging condition element, if the tagging condition element passes or fails. Then the system combines, in accordance with a predefined logic scheme, the results of the individual tagging condition elements from the determining step to further determine whether the loan (or data set) meets the conditions. An exemplary embodiment of a predefined logic scheme is shown in FIG. 12A.

In alternative embodiments of the present invention, the step of tagging also includes, determining, for each OR-group, based on results of the tagging condition element determination, whether each OR-group passes or fails; and determining, for each AND-group, based on the results of the OR-group determination, whether each AND-group passes or fails.

Furthermore, in an exemplary embodiment, the tagging step is performed on one of the received loans or data sets. In other embodiments, the tagging step is repeated for each of the received loans or data sets.

FIG. 12B shows an exemplary data set representative of a loan document. Any provision of a loan document could be represented as a field in the table shown in FIG. 12B. When the system performs the tagging process, the system will begin by comparing the individual conditions (element name column) of FIG. 12A to the data set shown in FIG. 12B. As shown in FIG. 12A, the funding date is less than or equal to Nov. 20, 2004. The system compares this condition to the data value in the data set. As shown in FIG. 12B, the data set indicates that the loan was funded on Nov. 30, 2004. Thus, the first condition is satisfied (e.g., passes or is true). The second condition in the table shown in FIG. 12A requires that the master number be equal to 123ABC. The table shown in FIG. 12B indicates that the master number is 123ABC. Thus, the second condition is satisfied. As shown in FIG. 12A, for OR-group 1 (1) to be satisfied, the funding date and master number conditions (the individual conditions within the OR-group) must both be satisfied. Since both the funding date and master number conditions are satisfied, then OR-group 1 (1) is satisfied. This process is repeated for every individual condition in the conditional information.

Figure 15:
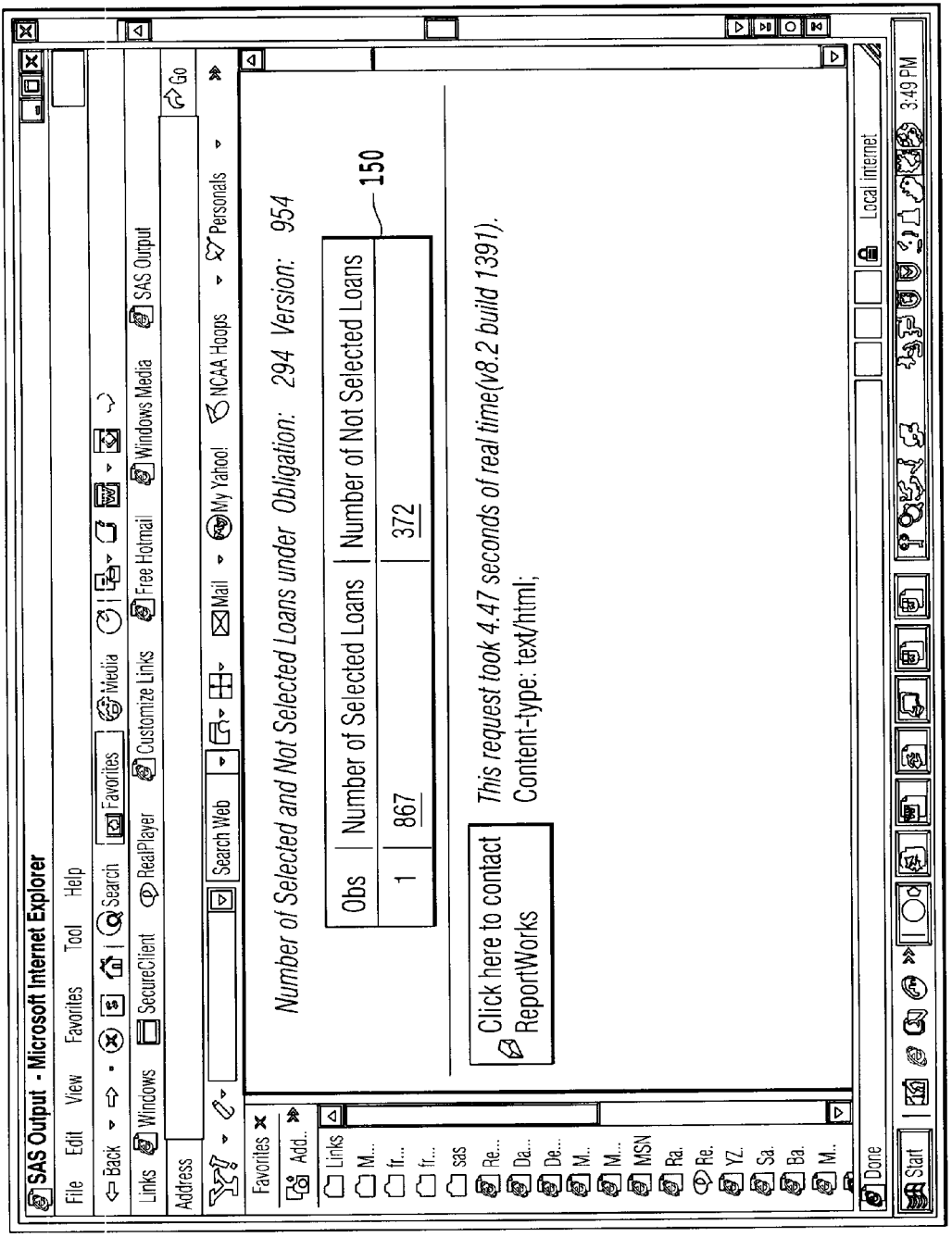
FIG. 15 shows an exemplary graphical user interface displaying an amount of tagged and un-tagged loans.

FIG. 15 shows a GUI that includes table 150, which shows a total number of tagged loans and a total number of non-tagged loans. In response to a query, the present invention can display what one or more conditions prevented a loan (or data set) from being tagged, as explained below.

Figure 16:
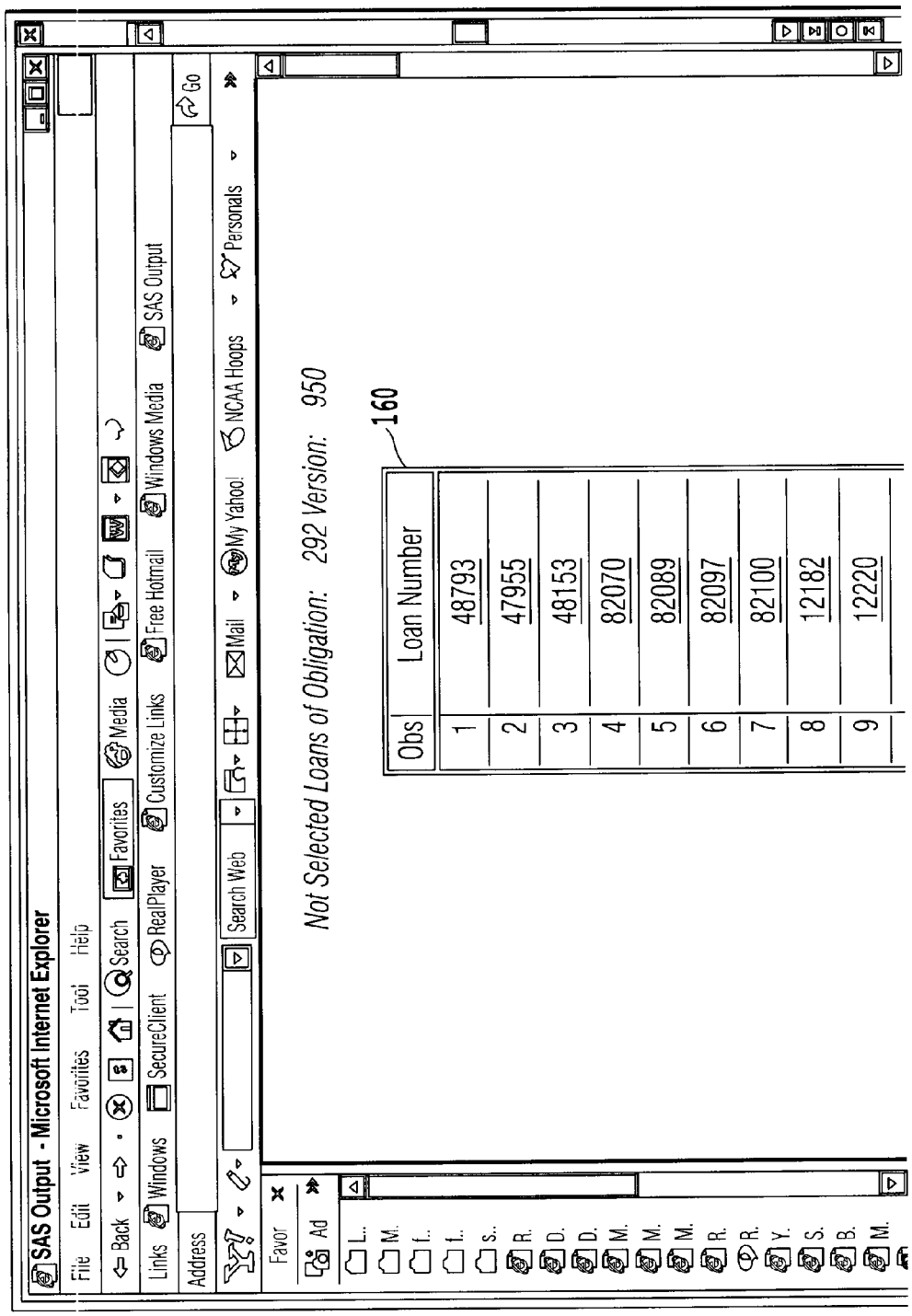
FIG. 16 shows an exemplary graphical user interface displaying loan numbers that were not tagged.

To display the results of the anti-tagging result, the user clicks on the number of "not selected loans" in FIG. 15. The selection of "number of selected loans" from table 150 will be discussed later. After clicking on the number of "not selected loans" the system displays a GUI as shown in FIG. 16. FIG. 16 shows a list of non-tagged loans listed by loan number. To see why a loan failed to be tagged, the user will click on one of the loan numbers displayed in FIG. 16.

After clicking on the loan number (for example loan number 82089), the system generates a GUI displaying tagging results for the selected loan. FIGS. 17A-17D show a GUI with table 170, which shows the tagging results for a particular loan (loan number 82089). The tagging results table 170 is formatted the same as the obligation/term version report 110, with the addition of one more column. The additional column displays the actual value of each element for the loan or data set. The user can compare this value to the tagging condition element to see exactly why the element passed or failed. The system colors each failed element, failed OR-group, and failed AND-group red. The system colors each passed OR-group and passed AND-group green. The system paints each passed tagging element yellow.

To display the anti-tagging results at the obligation level, the user can click on any of the tagging condition elements shown in FIGS. 17A-17D. The system then displays a GUI as shown in FIG. 18.

Figure 18:
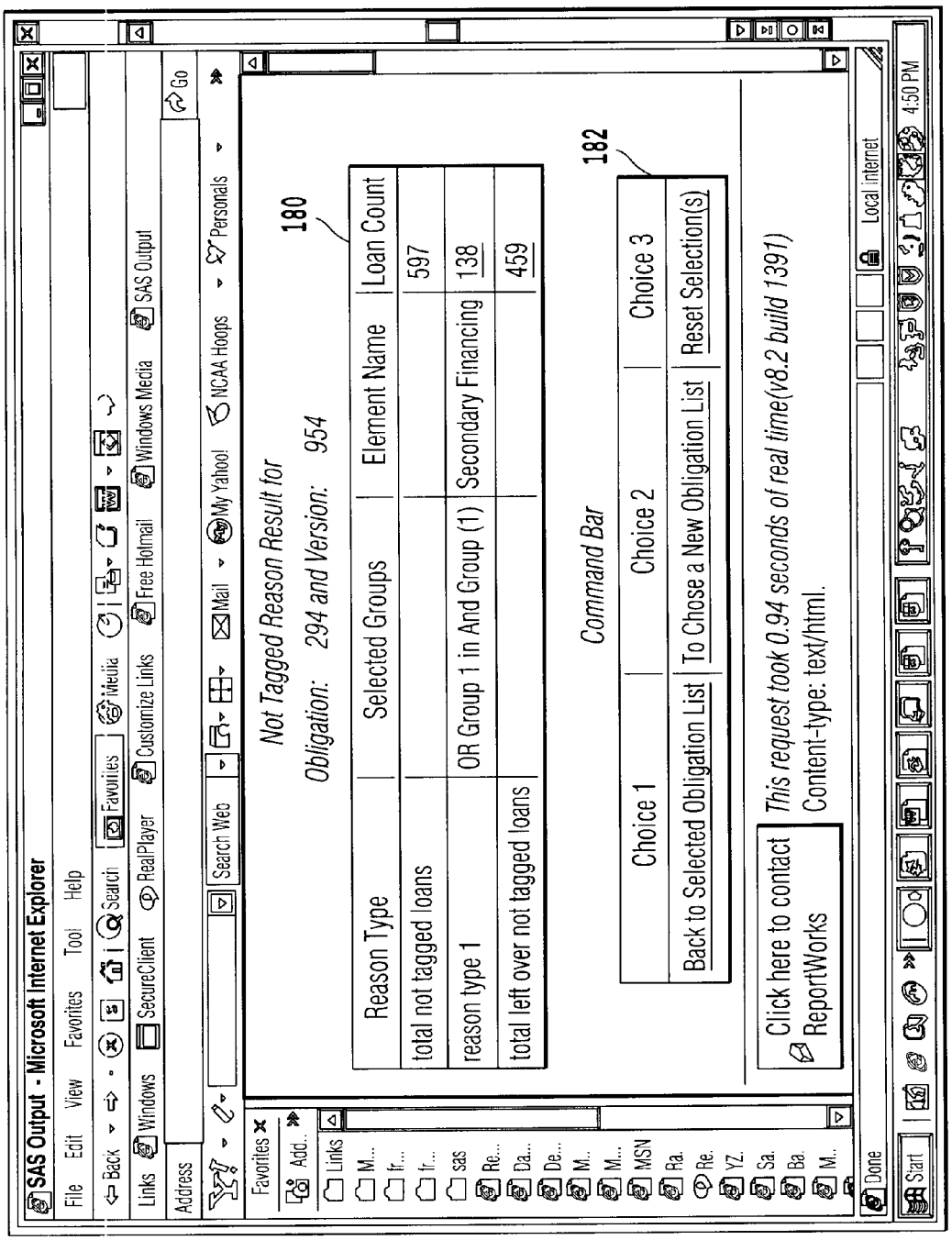
FIG. 18 shows an exemplary graphical user interface providing information as to loans that failed a condition.

FIG. 18 shows a GUI with table 180, which displays the total number of non-tagged loans for the selected obligation. In this example, 597 loans have not been tagged. The "total left over not tagged loans" shows the number of loans not yet identified for non-tagged reason(s). In this example, 459 loans of the 597 loans have failed for the identified reason. Table 180 also displays the number of loans that failed because of the user selected tagging condition element. For example, table 180 shows that 138 loans were not tagged because the loans failed the secondary financing condition in OR-group 1 in AND-group 1.

The GUI shown in FIG. 18 also includes command bar 182, which allows a user to return to the selected obligation list, to choose a new obligation list, and to reset the selection(s).

To continue identifying other reasons loans failed to be tagged, the user can click on the number of "total left over not tagged loans" of table 180. The system displays an html interface identical to table 160 in FIG. 16. The system also remembers previous user selections, and can display the previous user selections in a color different than the un-selected loans. The user can select a different loan, and repeat the process of clicking on one of the tagging condition elements.

Figure 19:
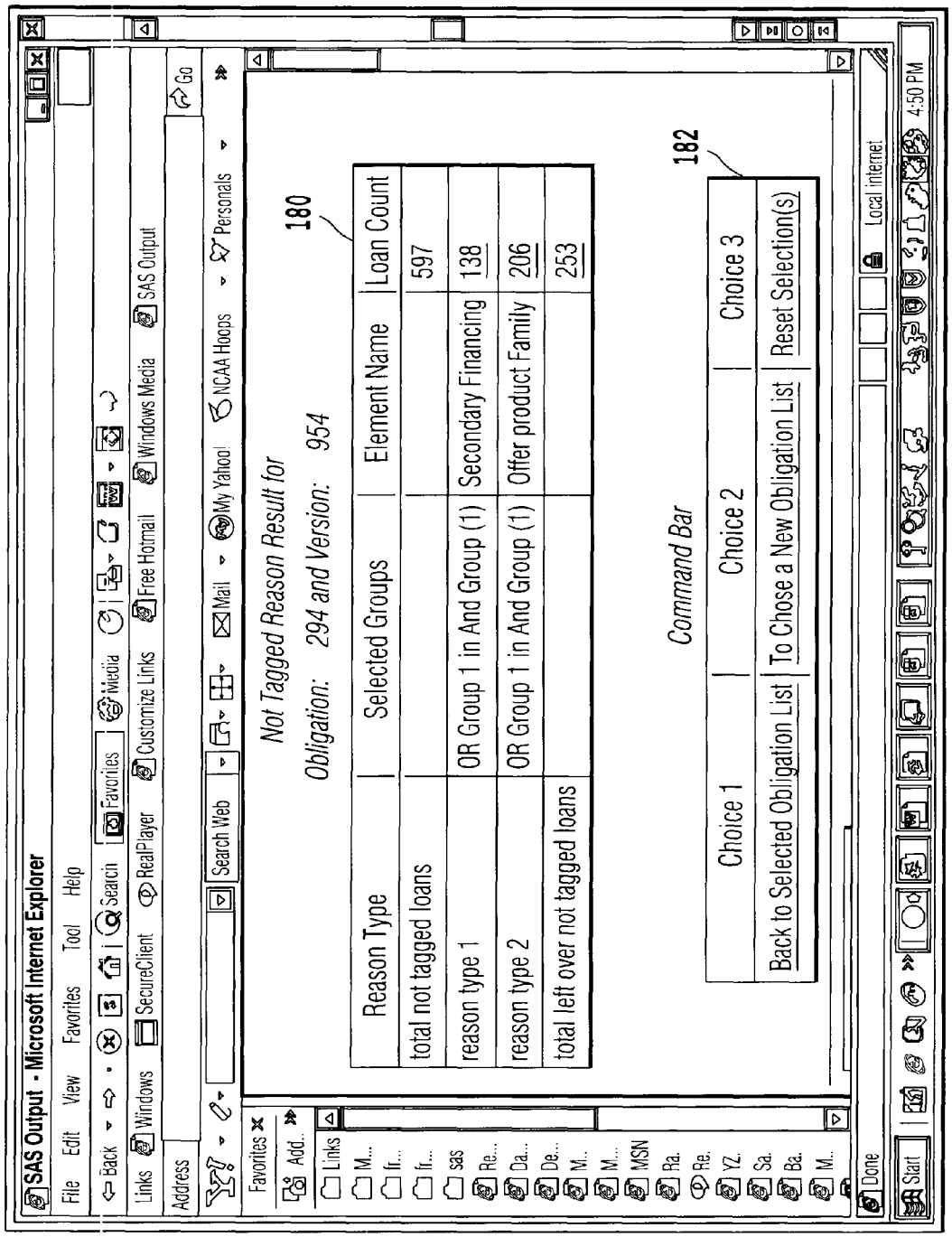
FIG. 19 shows an exemplary graphical user interface providing information as to loans that failed a plurality of conditions.

At the end of each repetition, the system inserts the results of the user selected tagging condition element into a summary report 190. For example, if the user selects the tagging condition element "offer product family," a GUI as shown in FIG. 19 is generated. As shown in table 190, 597 loans were not tagged, 138 loans were not tagged because they failed reason type 1 (see FIG. 18), and 206 loans were not tagged because they failed reason type 2 (offer product family). Table 190 shows that 253 loans failed to be tagged for reasons different from reason types 1 and 2.

The user can exhaust all possible reasons until "total left over not tagged loans" is zero, or chooses functions from command bar 182. If the user chooses the reset option on command bar 182, the system will again display the GUI of FIG. 16 and all summary information displayed in FIG. 17 or 18 is deleted.

Figure 20:
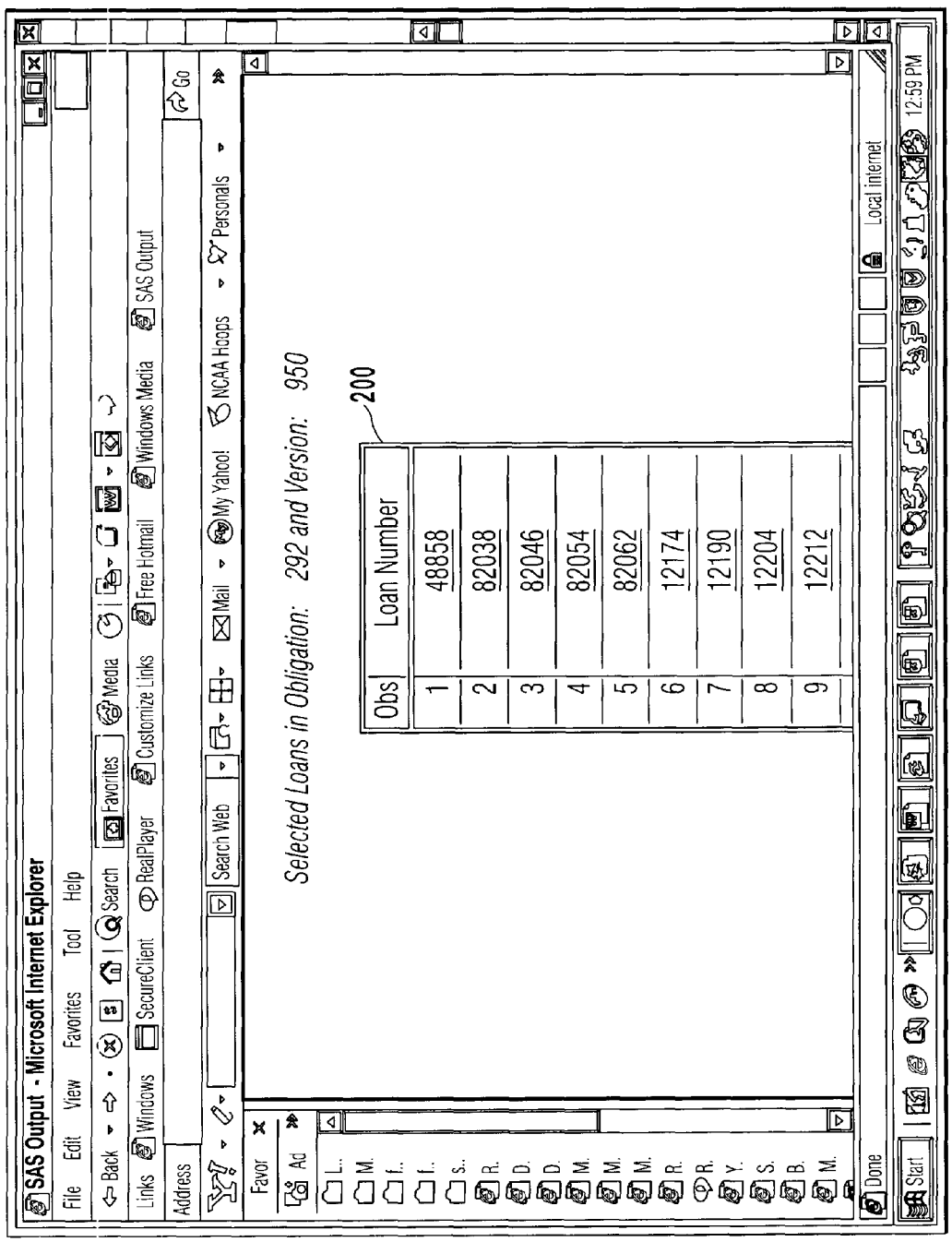
FIG. 20 shows an exemplary graphical user interface displaying loans in a particular obligation.
Figure 21A:
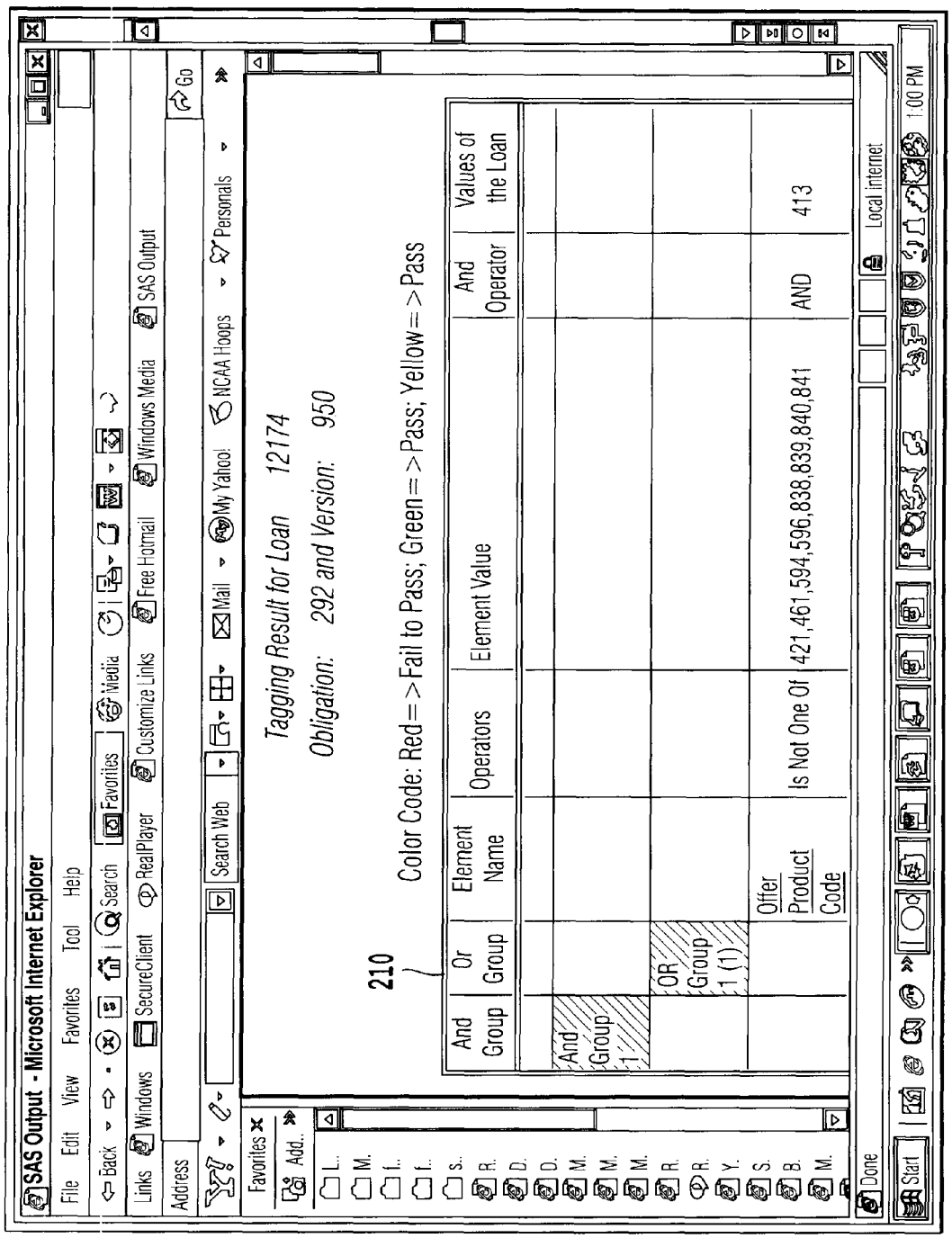
Figure 21C:
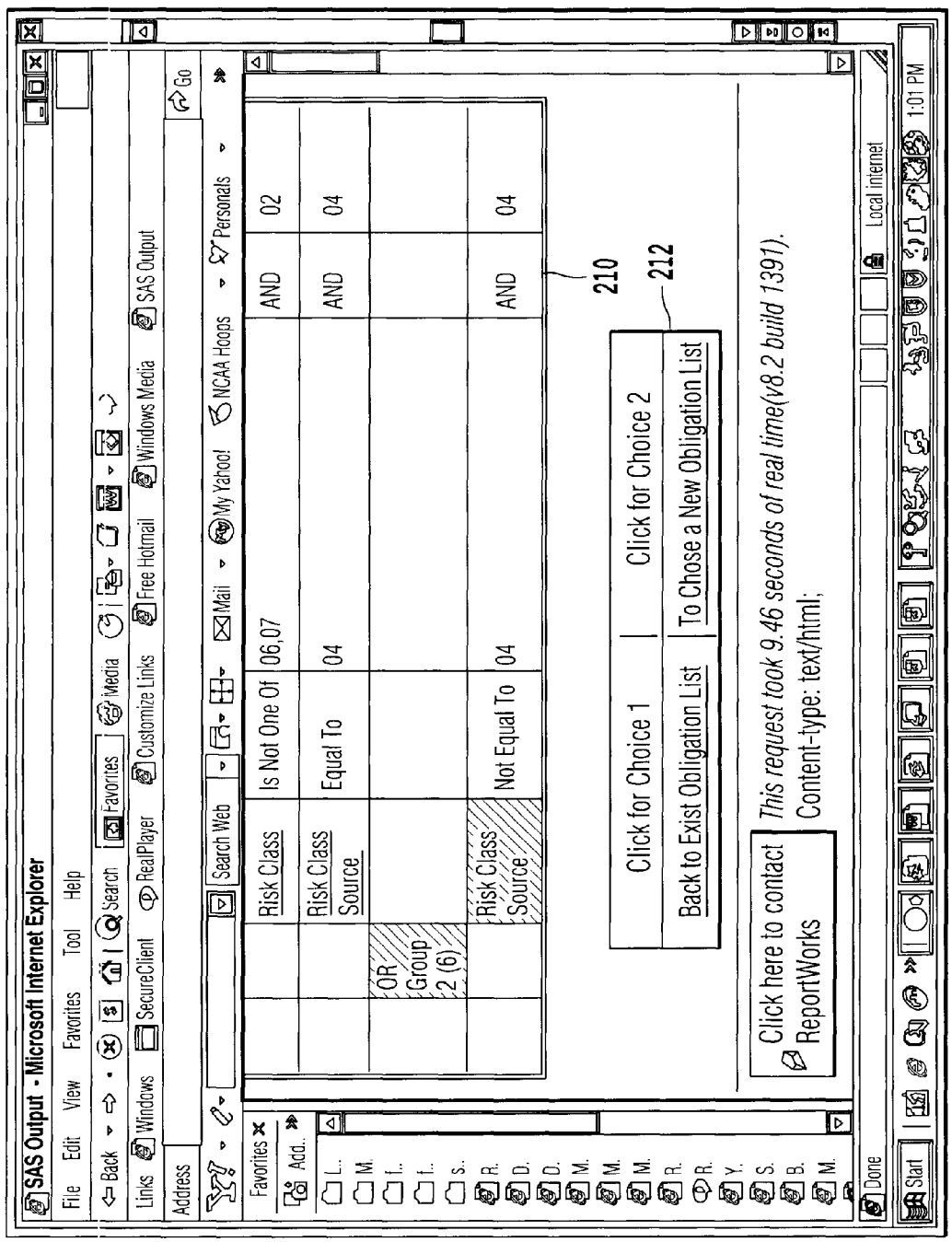

In another embodiment of the invention, the user can see the same detailed information for tagging condition elements for tagged loans. From the GUI in FIG. 15, the user will click on the number of selected loans from table 150. Then the system will generate the GUI shown in FIG. 20, which displays a list of loans in table 200 that were tagged (or selected). After the user selects a loan from table 200, the system generates a GUI, as shown in FIGS. 21A-21C, which is similar to FIGS. 17A-D. All detailed tagging results are shown in colors with the same format as red for fail, and green or yellow for pass.

In another embodiment of the claimed invention, tagging can be triggered by CE type. From the GUI shown in FIG. 5, the user selects obligation list 5 from table 50. The system then generates the GUI shown in FIG. 10, which displays approved obligation in tagging control table 100 by CE type. Table 100 lists all obligations approved and ready for tagging sorted by CE type. After a user click on any CE type, the system dynamically generates tagging code for each obligation under the selected CE type. The system then runs dynamically generated codes throughout the selected data set. To avoid time out by web server, which may be set to 580 seconds, and to speed up the process, the system optimizes the process by cutting the input loan data files into several small ones, depending on the complication of the tagging condition of each obligation. The system also checks how many seconds are left before reaching the 580 second limit as process is running. While the process is running, the system generates an html interface reporting current running status as shown in FIG. 22.

Figure 22:
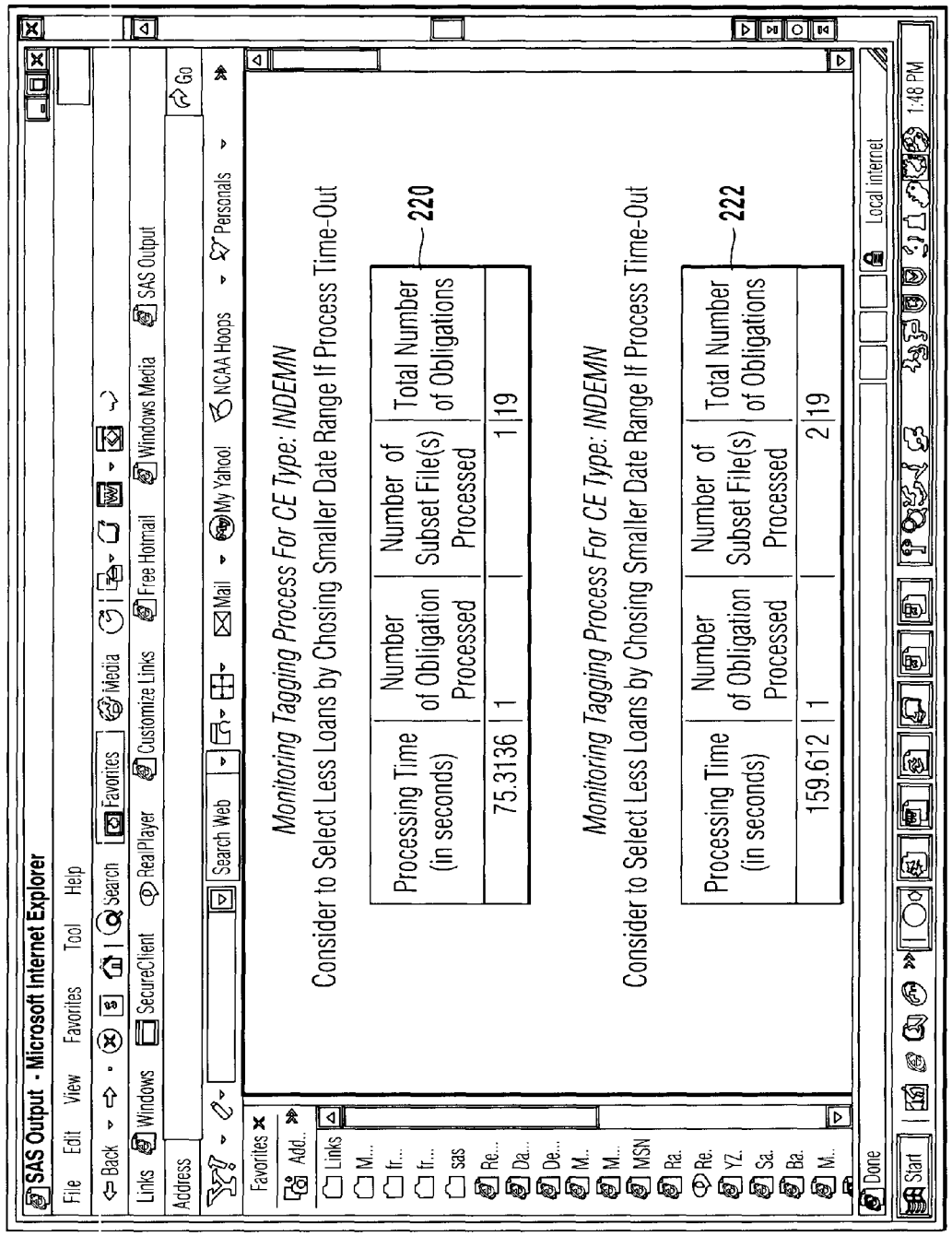
FIG. 22 shows an exemplary graphical user interface reporting current running status.

FIG. 22 shows tables 220 and 222, which includes the status of the processing at a time of 75.3136 seconds and at a time of 159,612 seconds, respectively.

Figure 23:
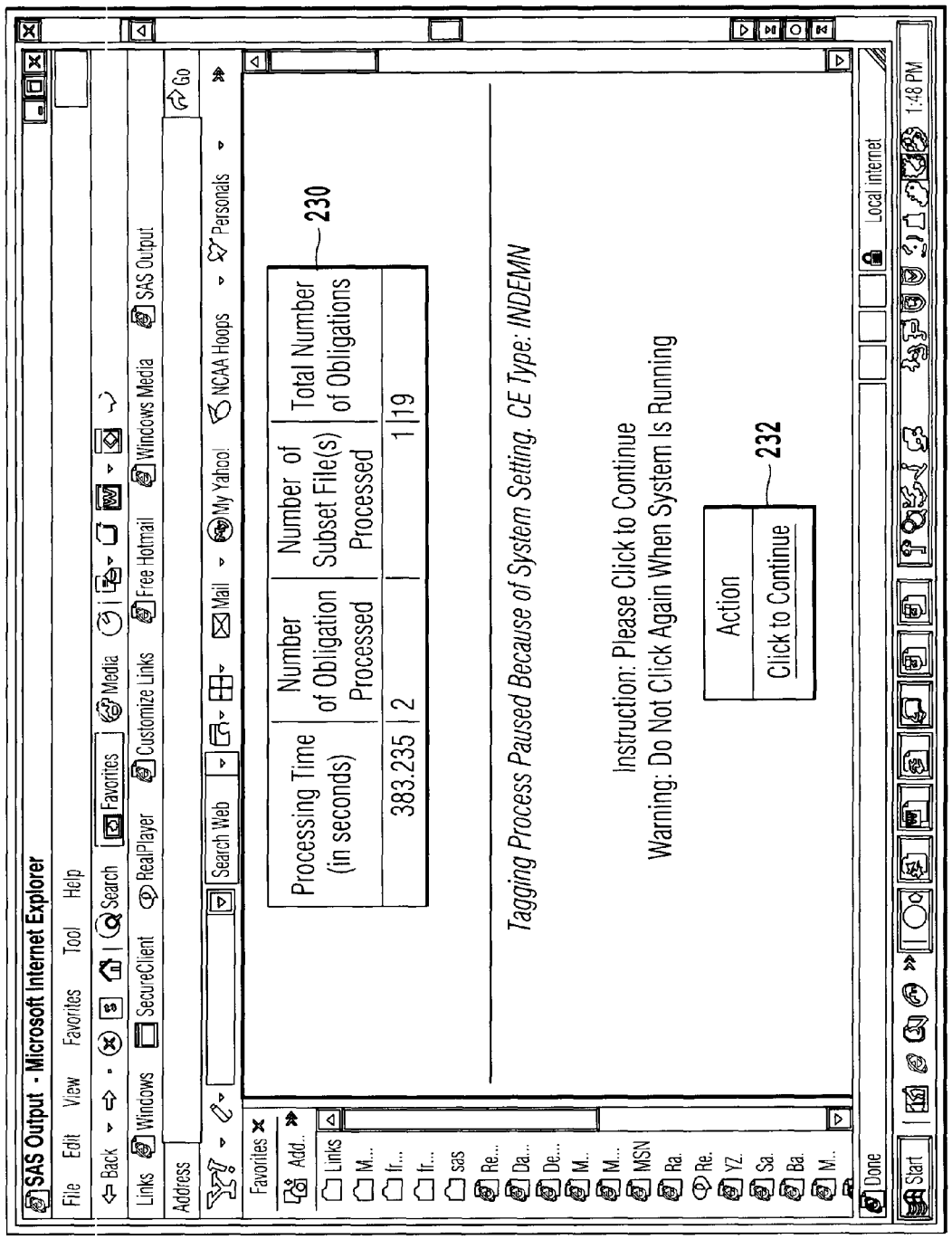
FIG. 23 shows an exemplary graphical user interface with a "continue" button.

If the system determines that the left time is not enough for the process to finish, the system pauses the process and generates an html interface with a "Click to Continue" button 232 as shown in FIG. 23. Table 230 shows the state of the processing when the process is paused. A user can click on "Click to Continue" button 232 to resume the process until the process finishes. When process finishes, the system will generate an html interface, as shown in FIG. 24.

Figure 24:
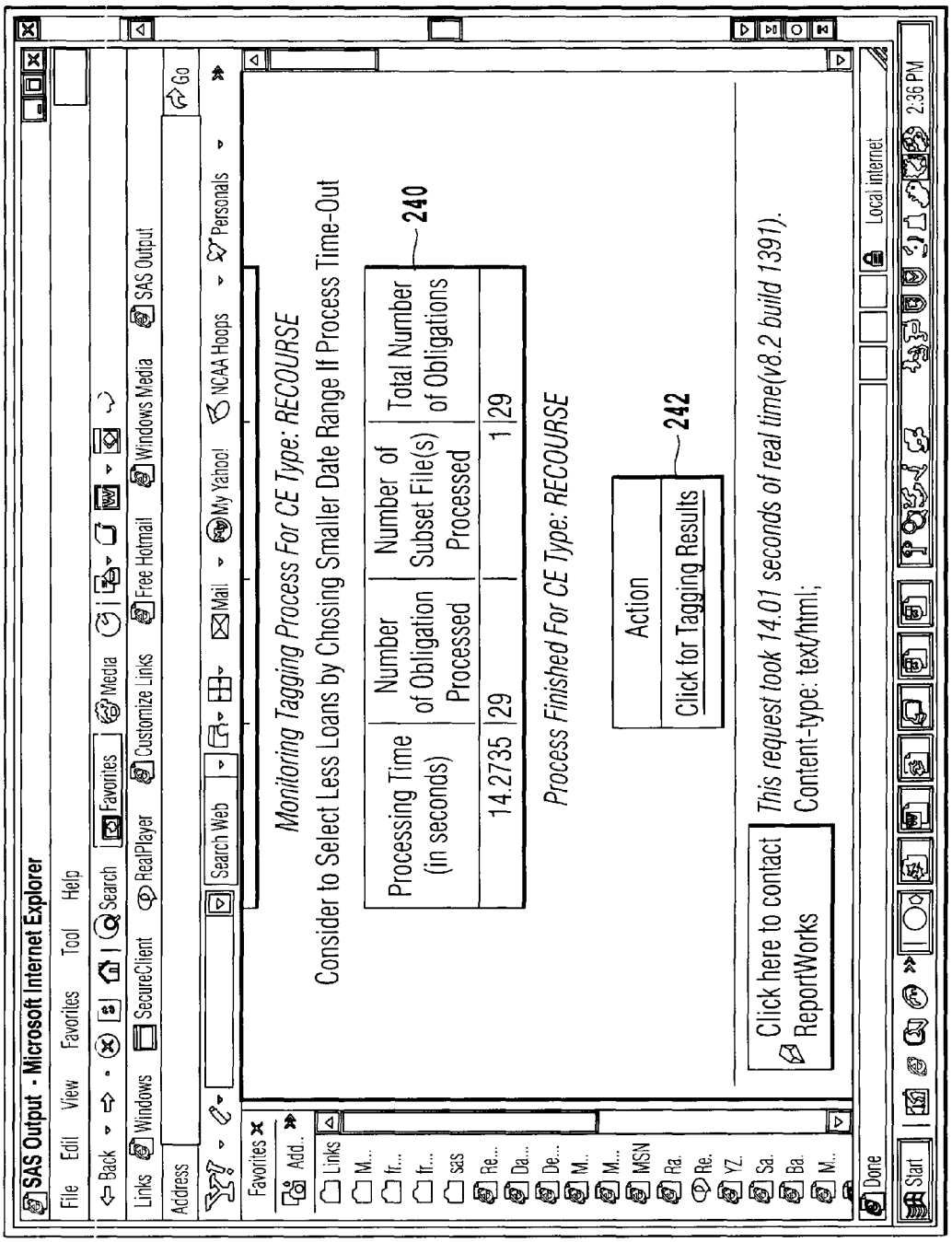
FIG. 24 shows an exemplary graphical user interface displayed when a process is finished.

FIG. 24 shows a GUI that includes table 240. Table 240 displays processing status for the completed process. The GUI of FIG. 24 also includes a "Click for Tagging Results" button 242 at the bottom of status interface.

Figure 25:
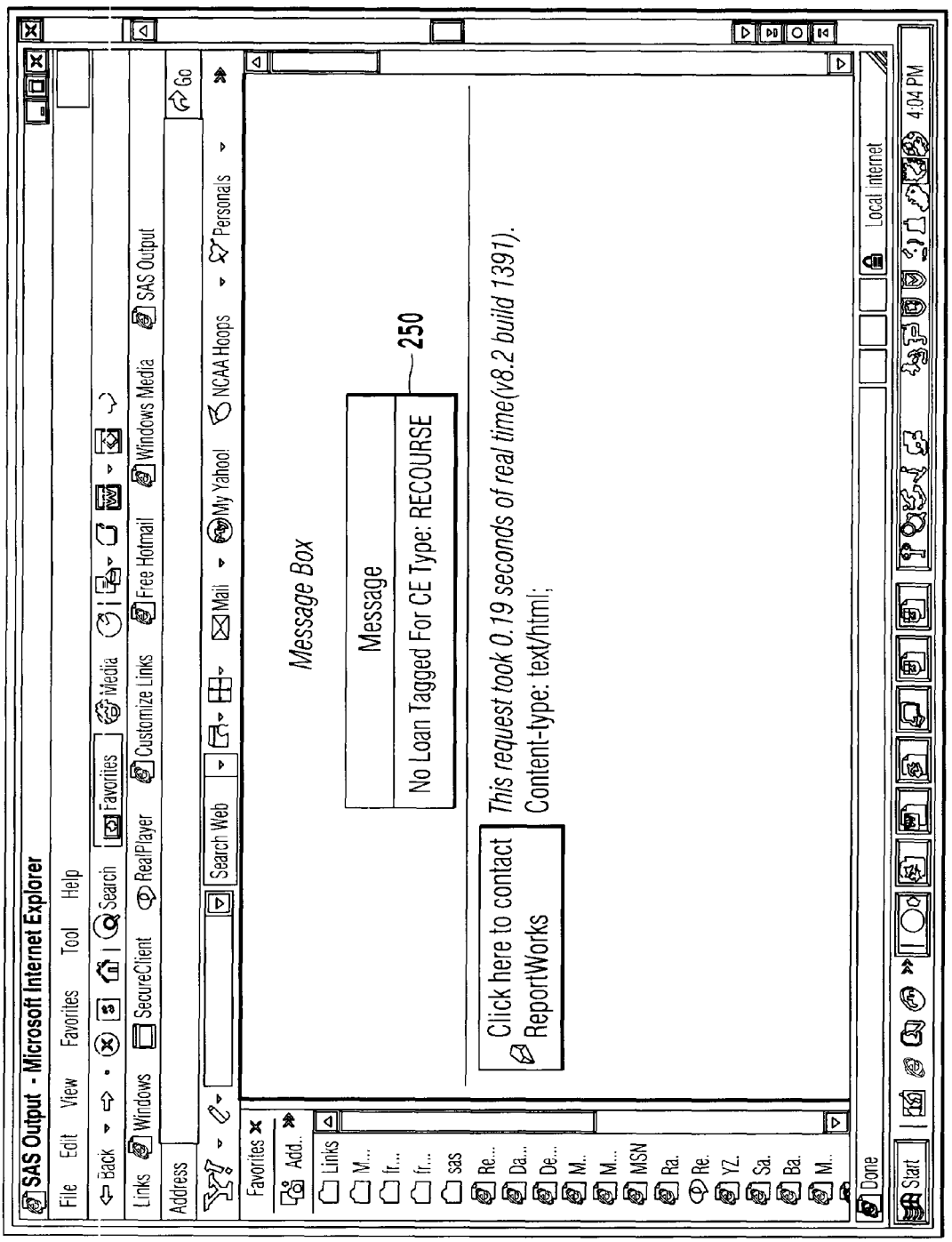
FIG. 25 shows an exemplary graphical user interface reporting no loan tagged.
Figure 26:
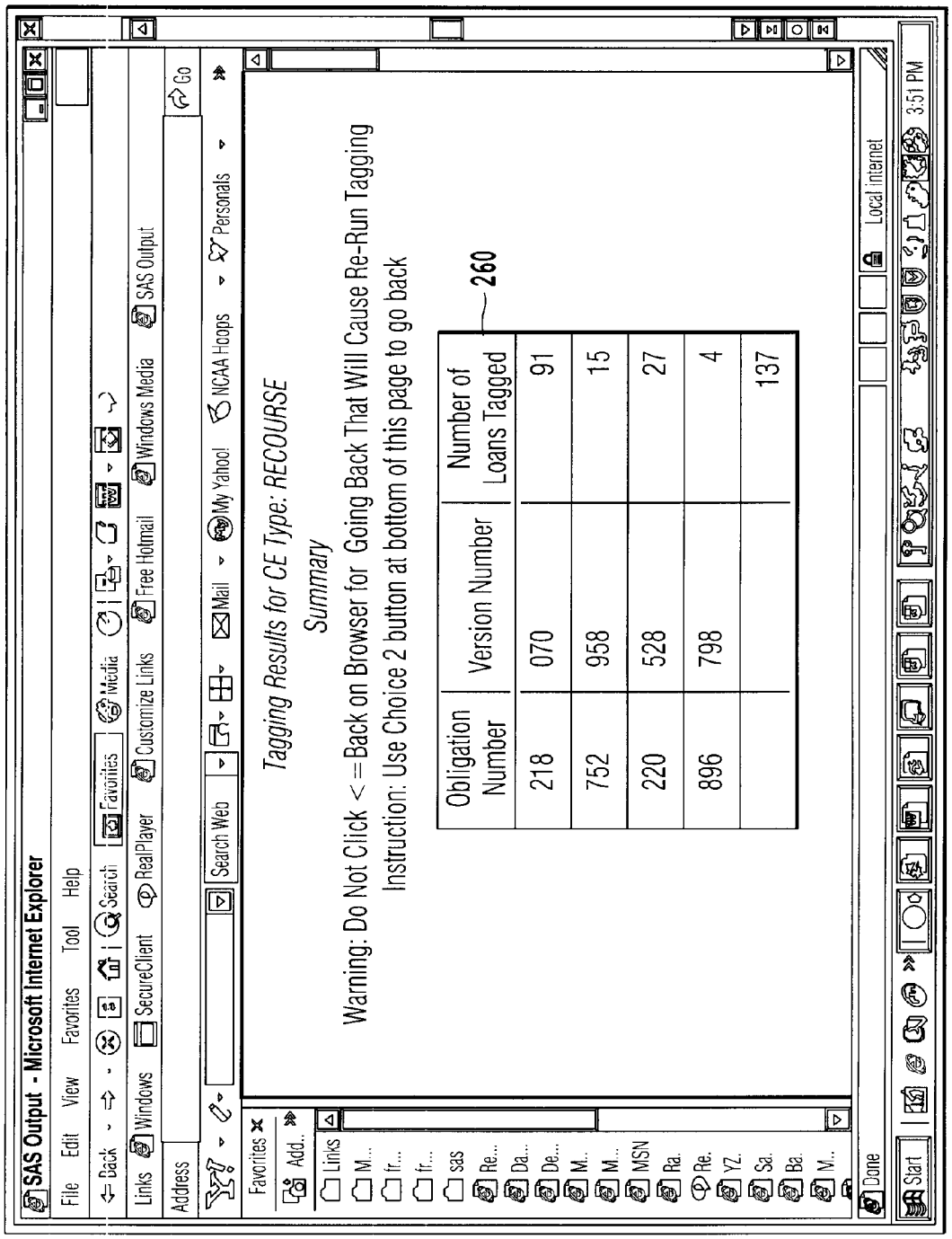
FIG. 26 shows an exemplary graphical user interface displaying a distribution of tagged loans under each obligation.

After the user clicks on the "Click for Tagging Results" button 242, depending on the tagging results, the system produces an html web page either reporting no loan tagged (see table 250 of FIG. 25) or distribution of tagged loans under each obligation in selected CE type. (See table 260 of FIG. 26).

Figure 4:
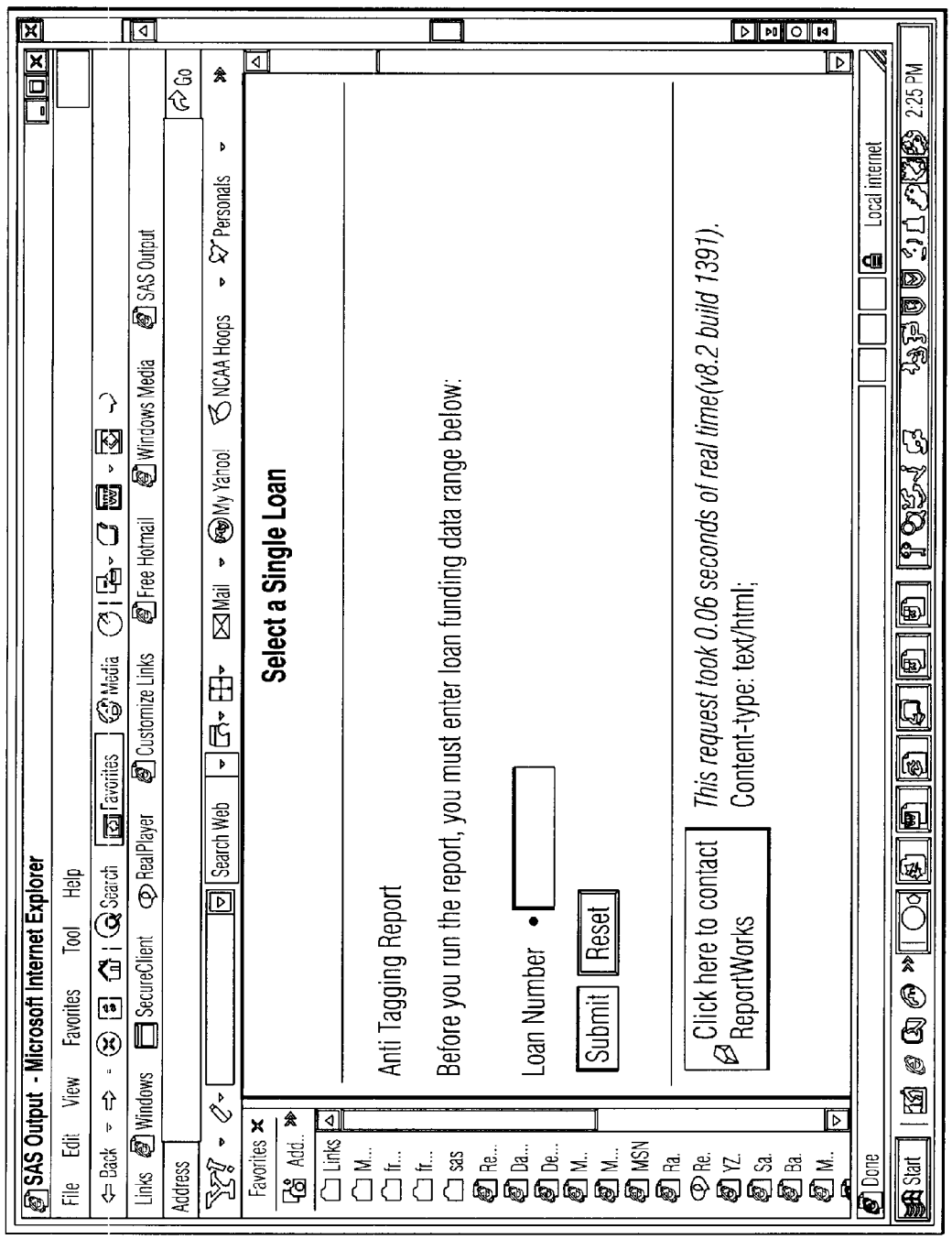
FIG. 4 is another exemplary graphical user interface used in a non-limiting embodiment of the invention.

In another embodiment of the present invention, loan data can be collected by loan number, as shown in the GUI of FIG. 4. If a user enters a loan number into the GUI shown in FIG. 4, the system matches the loan number against all loans to see if the loan is tagged. The system also matches the loan corresponding to the entered loan number against all loans to see if the loan has been funded within the last 12 months.

Figure 27:
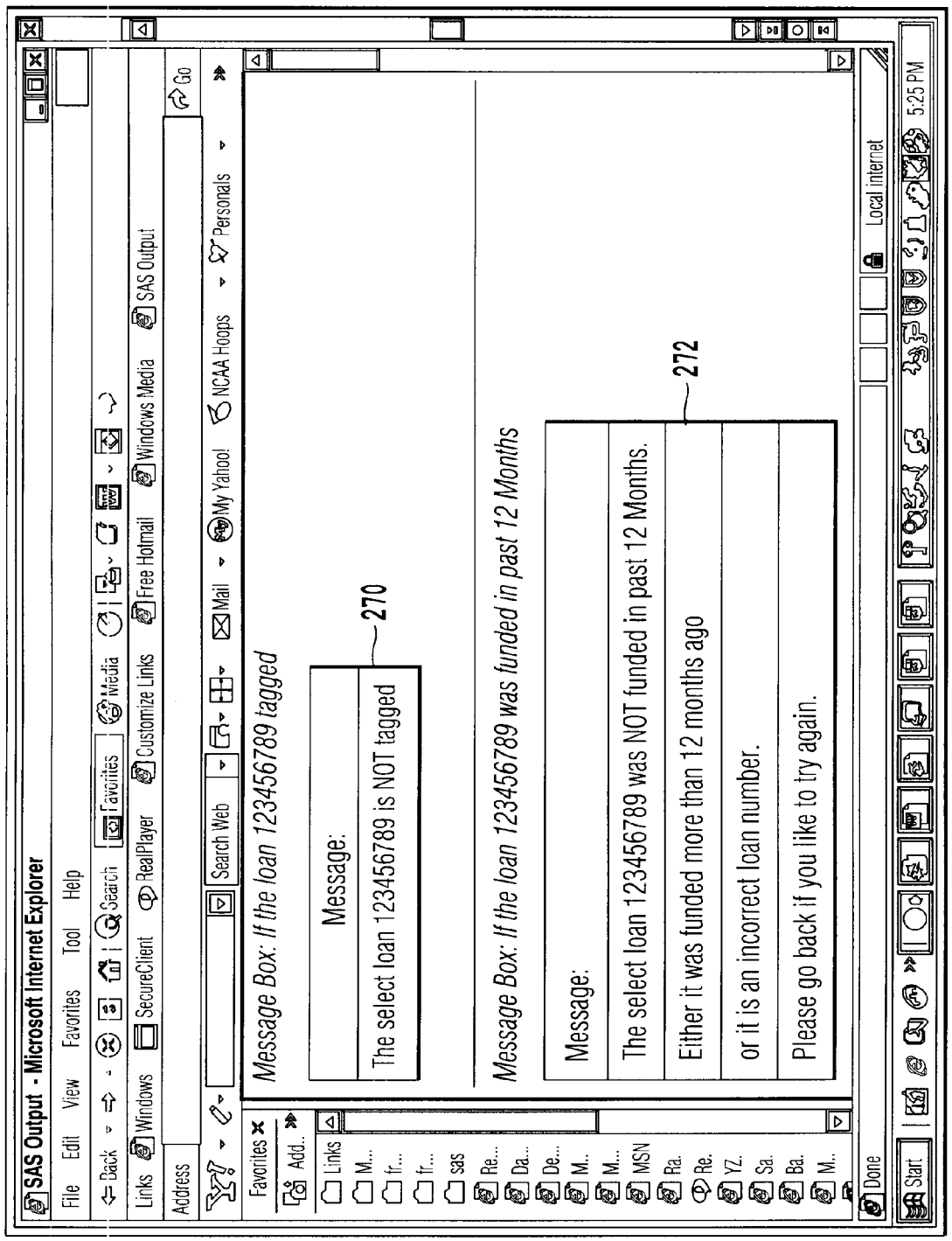
FIG. 27 shows an exemplary graphical user interface displaying checking results when a loan is not tagged.

If the system determines that the loan is not tagged, then the GUI shown in FIG. 27 is displayed. The GUI of FIG. 27 displays information stating that loan 123456789 is not currently tagged in table 270. The GUI of FIG. 27 also displays information stating that loan 123456789 was not funded in the last 12 months in table 272.

Figure 28A:
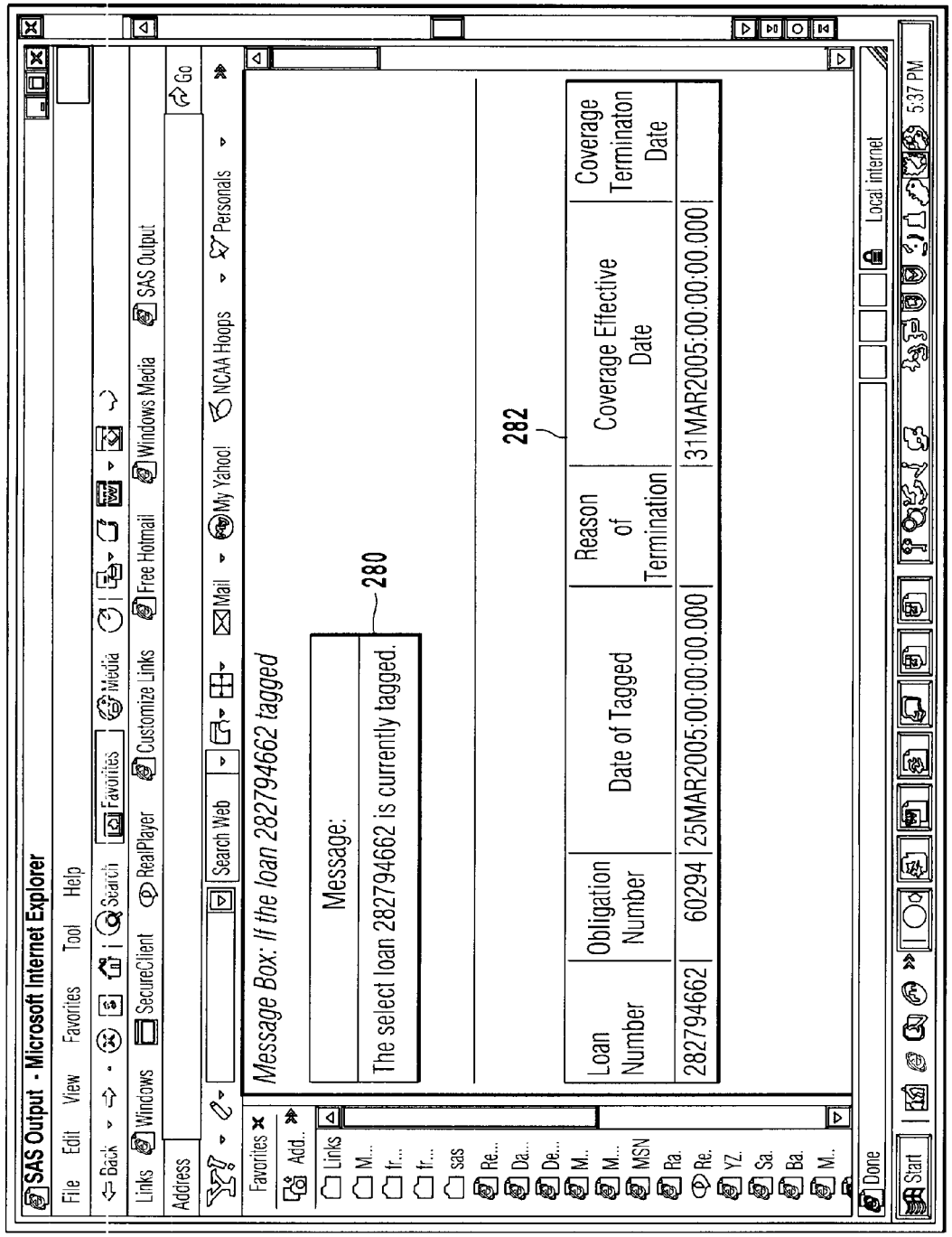
FIGS. 28A and 28B shows an exemplary graphical user interface displaying checking results when a loan is tagged.

If the system determines that the loan is tagged, a GUI as shown in FIGS. 28A and B is shown. As shown in FIG. 28A, the GUI displays table 280, which includes a message that the loan is tagged, and table 282 includes information of the corresponding obligation number, and the date that the loan was tagged.

Figure 28B:
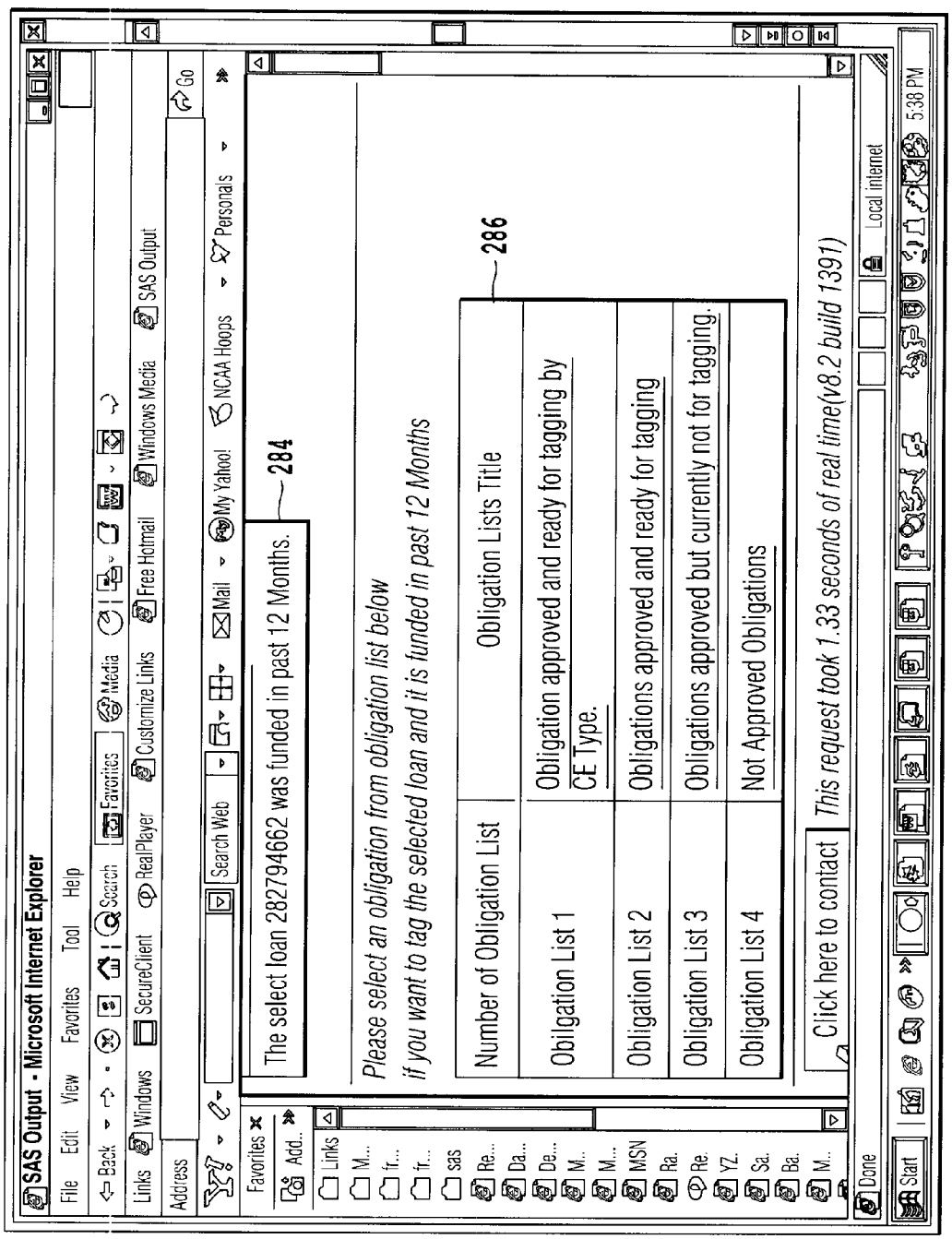

FIG. 28B is a continuation of the GUI of FIG. 28A. Table 284 displays information that the loan was funded in the past 12 months. As shown in FIG. 28B, the user is presented the option of choosing between 4 obligation lists in table 286. After the user selects any obligation list from the GUI shown in FIG. 28B, the system performs the same actions as done when user selects loans by date range.

In the embodiments described above, the user can move backward or forward between the GUIs (or html pages) by clicking on the backward or forward arrows of the browser.

The GUI's may also be provided with interface buttons configured to allow the user to move to some specified interface.

Furthermore, the information displayed in the GUIs (or html pages) may be downloaded into a spread sheet program, such as Excel™.

Figure 29:
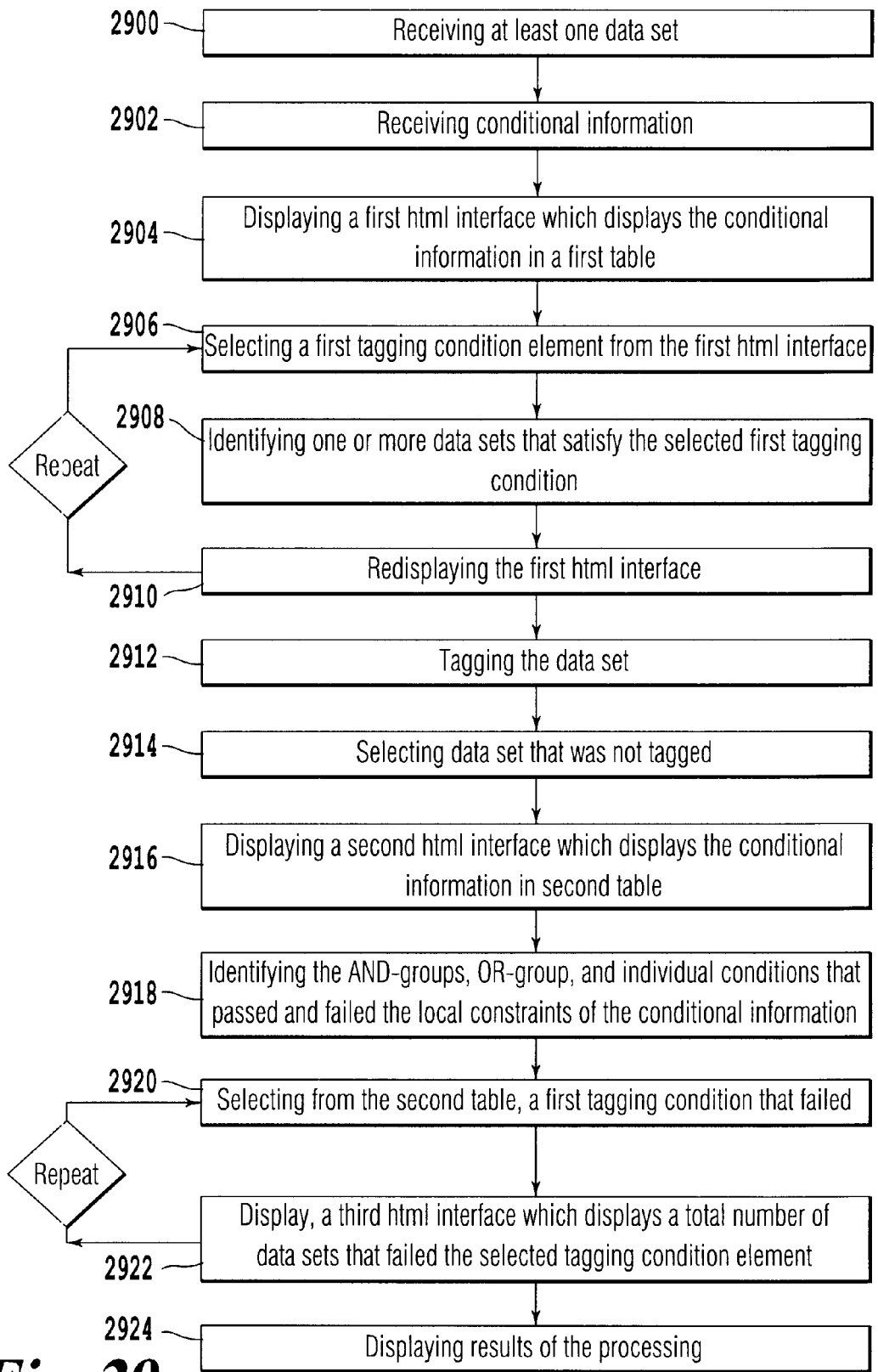
FIG. 29 is a high-level flow chart of a process employed according to an exemplary embodiment of the claimed invention.

FIG. 29 is a flow chart depicting an exemplary method for practicing the present invention. In step 2900, a computer receives at least one data set. The computer may actively or passively receive the at least one data. Furthermore, the at least one data may be representative of a loan document. The data set may be identified by data range or by some identification number In step 2902, the computer receives conditional information. The computer may actively or passively receive the condition information. The conditional information may include one or more logical constraints each expressed as an AND-group, an OR-group within the AND-group, and an individual condition corresponding to a tagging condition element. FIG. 1 shows an example of a grouping of AND-groups, OR-groups, and individual conditions. The conditional information may be representative of one or more requirements of a mortgage insurer sharing risk associated with a default of a loan.

In step 2904, the computer displays a first html interface which displays the conditional information in first table, the first table including an html enabled tagging condition element. An example of such an interface is the GUI of FIGS. 11A and 11B.

In step 2906, in a preliminary step, the user may select a tagging condition element from the first html interface. As shown in FIG. 13A, tagging condition "master number" is selected. In step 2908, the computer will identify one or more data sets that satisfy (pass) the selected tagging condition. As shown in FIG. 13A, "master number" is colored yellow (the lighter background). In step 2910, the computer redisplays the first html interface, as shown by table 130 of FIG. 13a. The user can repeat steps 2906-2910 as desired. See FIG. 14, where the user additionally selects "offer product family" as second tagging condition element.

In step 2912, the computer tags the loans that satisfies (passes) the conditional information. As shown in FIG. 15, a GUI with table 150 may display the number of selected loans and the number of non-selected loans.

Figure 17A:
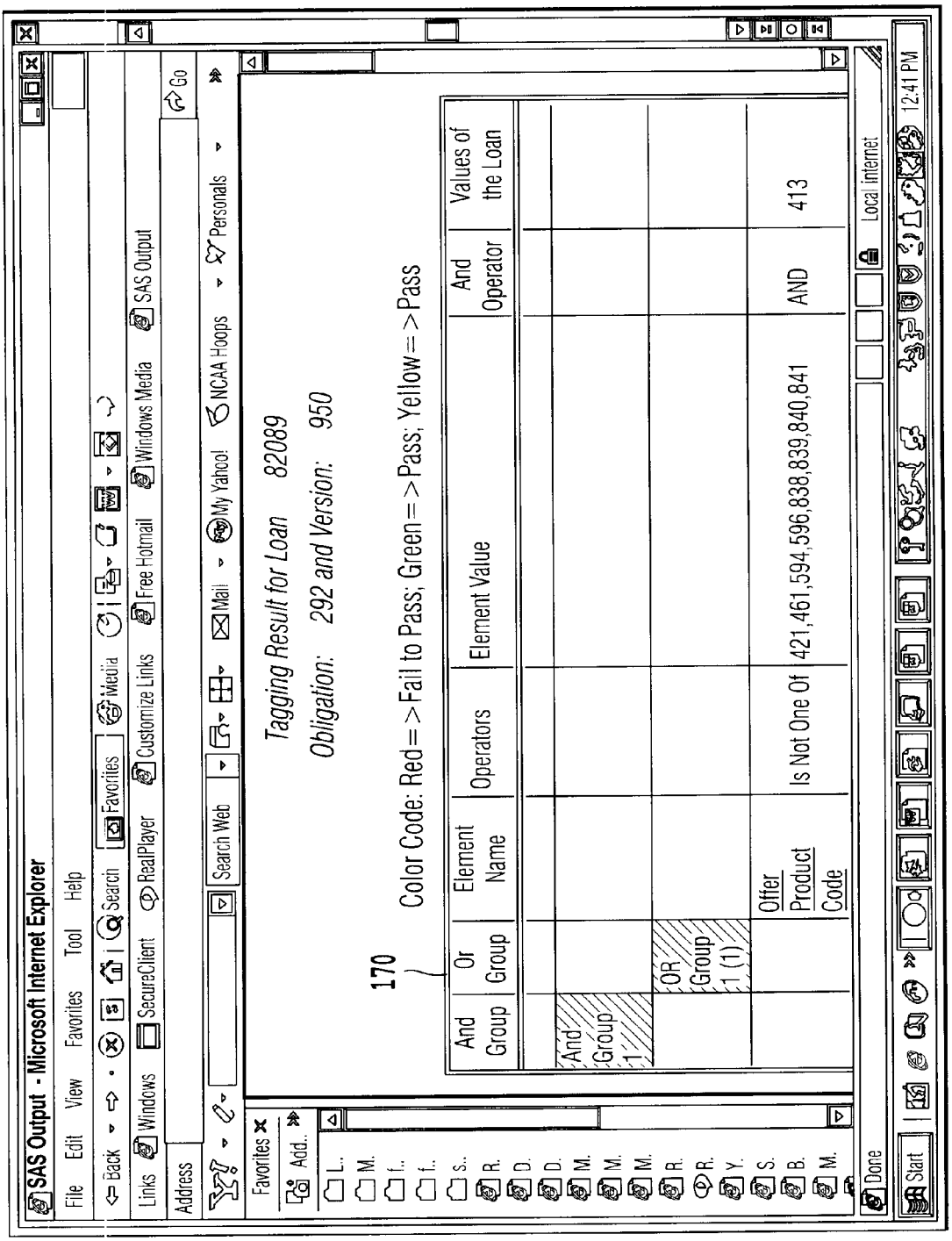
FIGS. 17A-17D shows an exemplary graphical user interface displaying the tagging results for a loan.
Figure 17B:
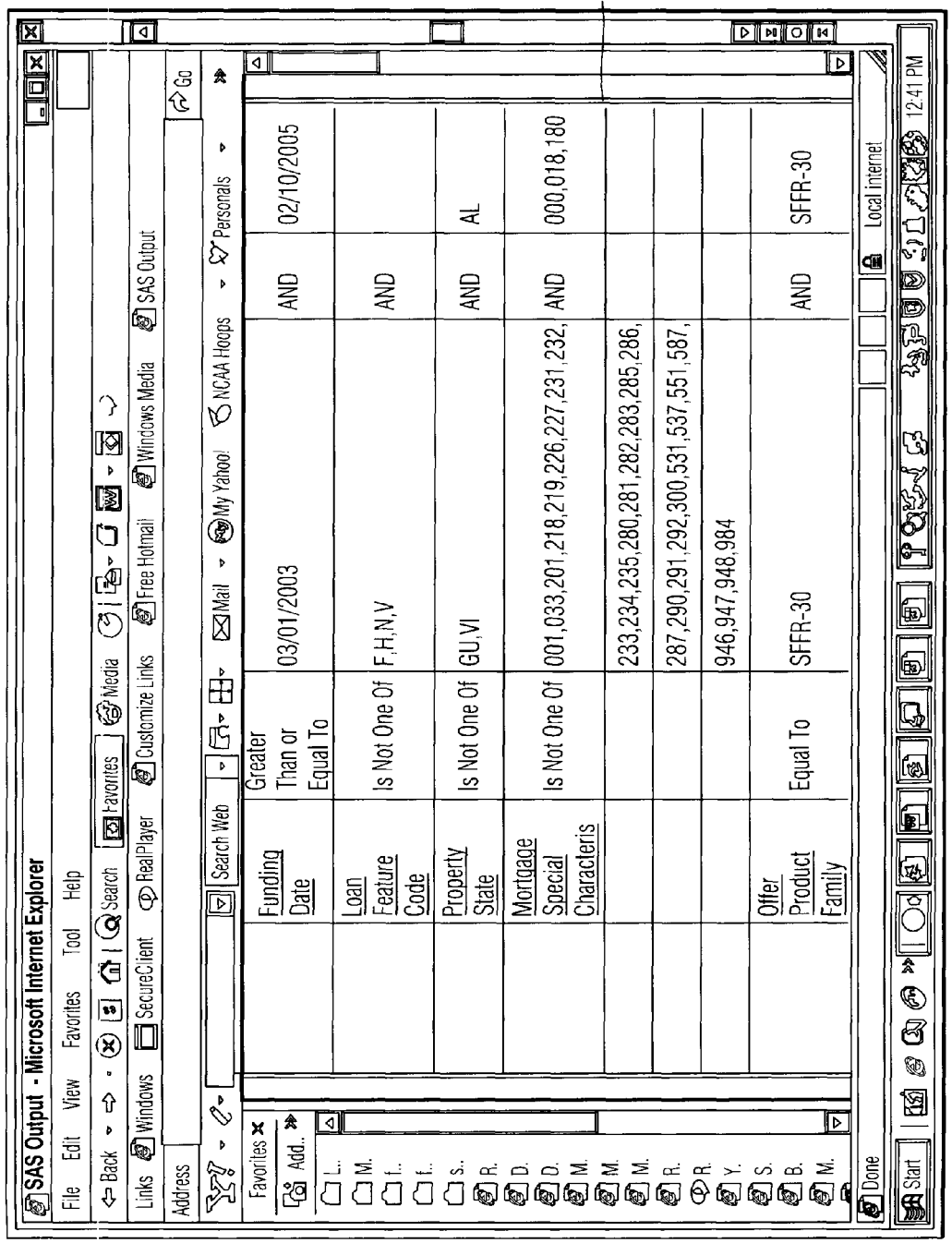
Figure 17C:
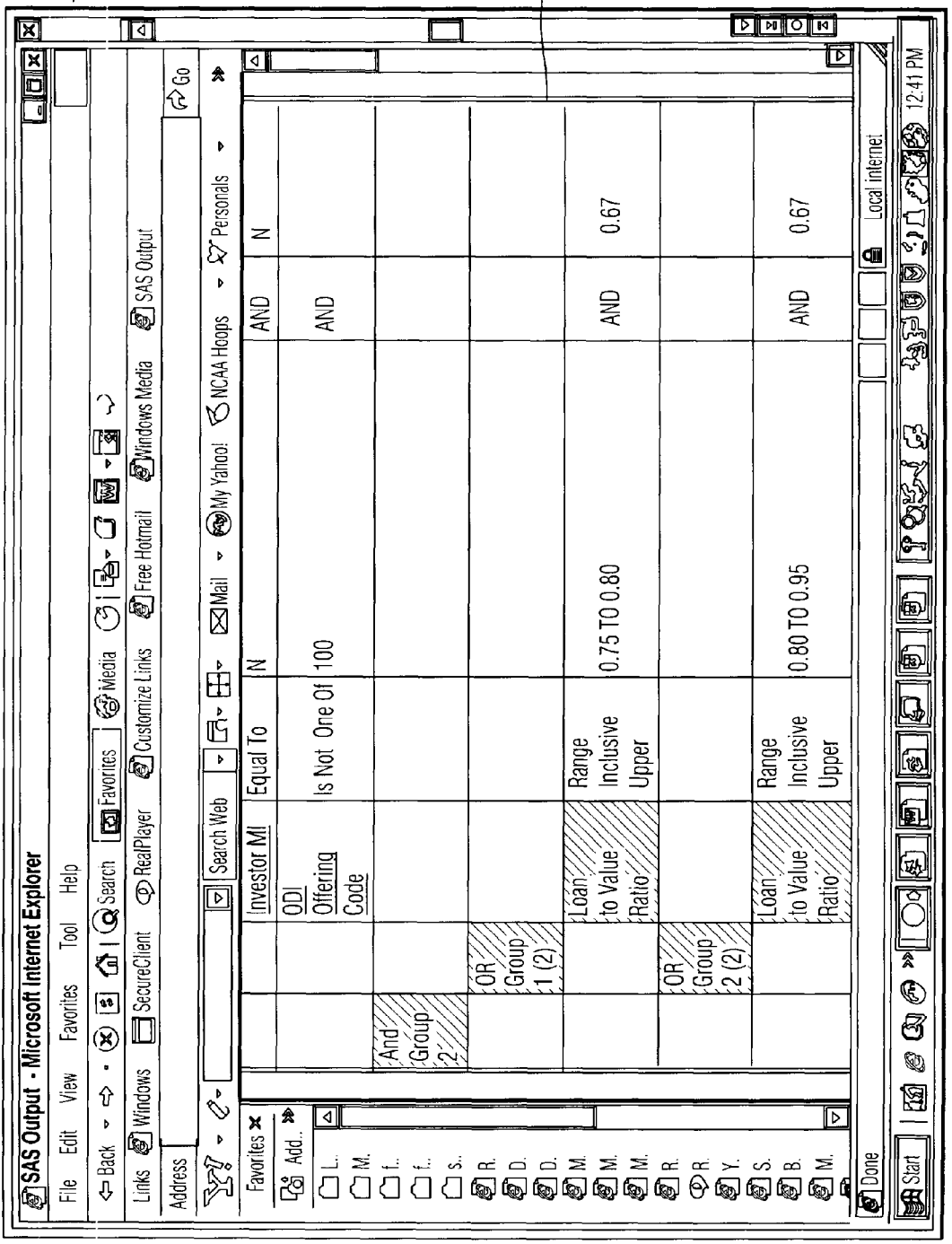
Figure 17D:
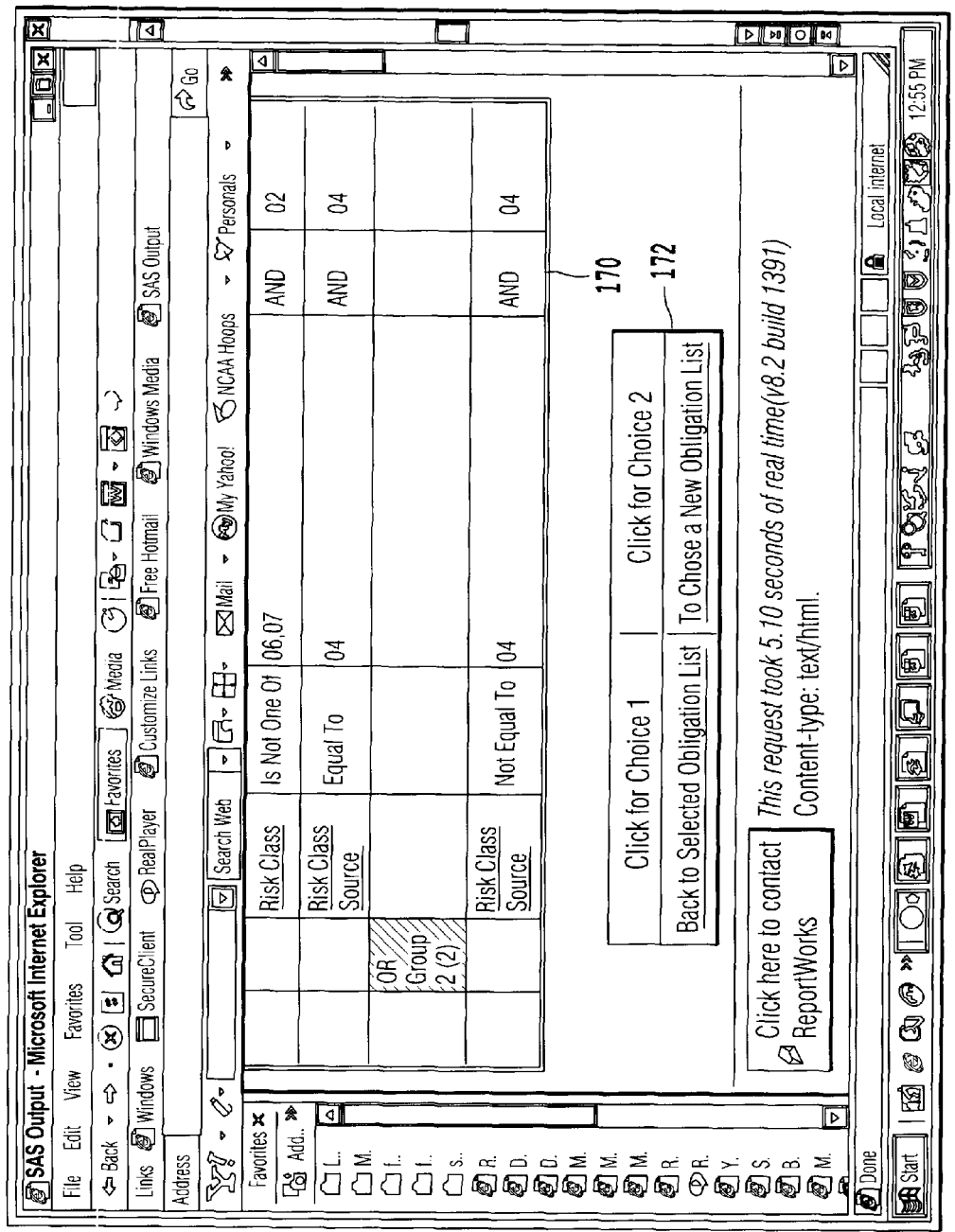

In step 2914, a data set that was not tagged is selected. As shown in FIGS. 16 and 17A, non-tagged loan 82089 is selected. In step 2916, the computer displays a second html interface which displays the conditional information in a second table, the second table including the html enabled tagging condition elements and a value of the data set that is compared to the conditional information. See table 170 as shown in FIG. 17A, where items in the "element name" column are html enabled tagging condition elements. In step 2918, the computer identifies the and-groups, or-groups, and individual conditions that passed and failed the logical constraint of the conditional information. As shown in FIGS. 17A-17D, red colored cells indicate a failure, while green and yellow colored squares indicate a pass.

In step 2920, a second tagging condition element that failed is selected from the second table. In step 2922, a third html interface displays a total number of data sets that failed the selected second tagging condition element. As shown in FIG. 18, "secondary financing" is selected as the second tagging condition element that failed and table 180 is displayed. Steps 2920-2922 may be repeated as desired by the user until all loans that were not tagged are accounted for. See FIG. 19.

In step 2924, results of the processing are displayed. Results of the processing can include the results of the tagging step, the number of data sets that satisfy a selected tagging condition, etc.

Figure 30:
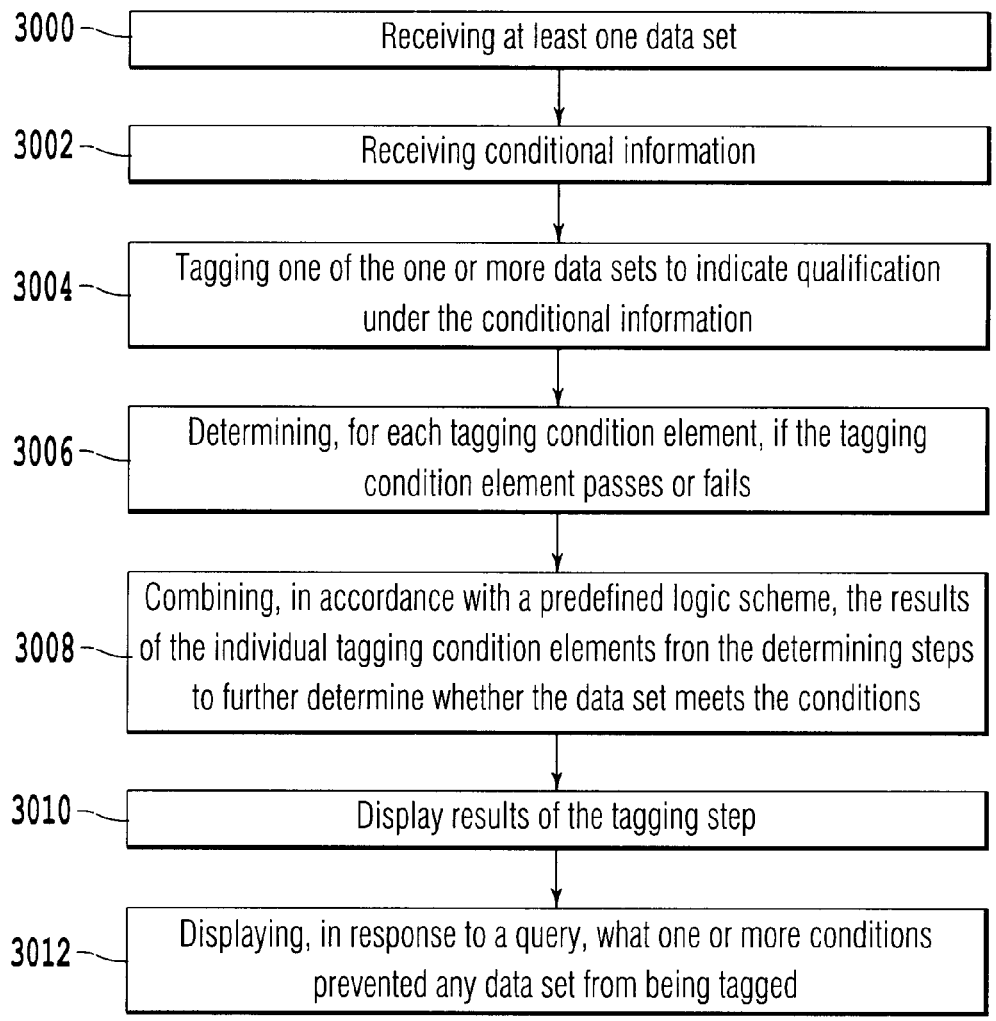
FIG. 30 is a high-level flow chart of a process employed according to another exemplary embodiment of the claimed invention.

FIG. 30 is a flow chart depicting another exemplary method for practicing the present invention. In step 3000, a computer receives at least one data set. The computer may actively or passively receive the at least one data. Furthermore, the at least one data may be representative of a loan document. The data set may be identified by data range or by some identification number In step 3002, the computer receives conditional information. The computer may actively or passively receive the condition information. The conditional information may include one or more logical constraints each expressed as an AND-group, an OR-group within the AND-group, and an individual condition corresponding to a tagging condition element. FIG. 1 shows an example of a grouping of AND-groups, OR-groups, and individual conditions. The conditional information may be representative of one or more requirements of a mortgage insurer sharing risk associated with a default of a loan.

In step 3004, the computer tags one of the one or more data sets to indicate qualification under the conditional information.

In step 3006, the computer performs the tagging step by determining, for each tagging condition element, if the tagging condition element passes or fails.

In step 3008, the computer combines, in accordance with a predefined logic scheme, the results of the individual tagging condition elements from the determining step to further determine whether the data set meets the conditions.

In step 3010, the results of the tagging step are displayed.

In step 3012, the computer displays, in response to a query, what one or more conditions prevented any data set from being tagged.

The present invention is applicable to situations other than risk sharing. For example, the present invention may be used in a profit sharing situation. For example, Company B may want to purchase an asset backed security from Company C. Company B could use the present invention to analyze data representative of several asset backed securities and compare the data to Company B's own criteria.

For example, if Company B analyzed 100 asset backed securities of Company C and 99 of them failed to be selected (or tagged) for purchase, Company B could use the present invention to display the pass/fail decisions for each individual condition. Company B could then determine why 99% of Company C's asset backed securities were not tagged.

Figure 31:
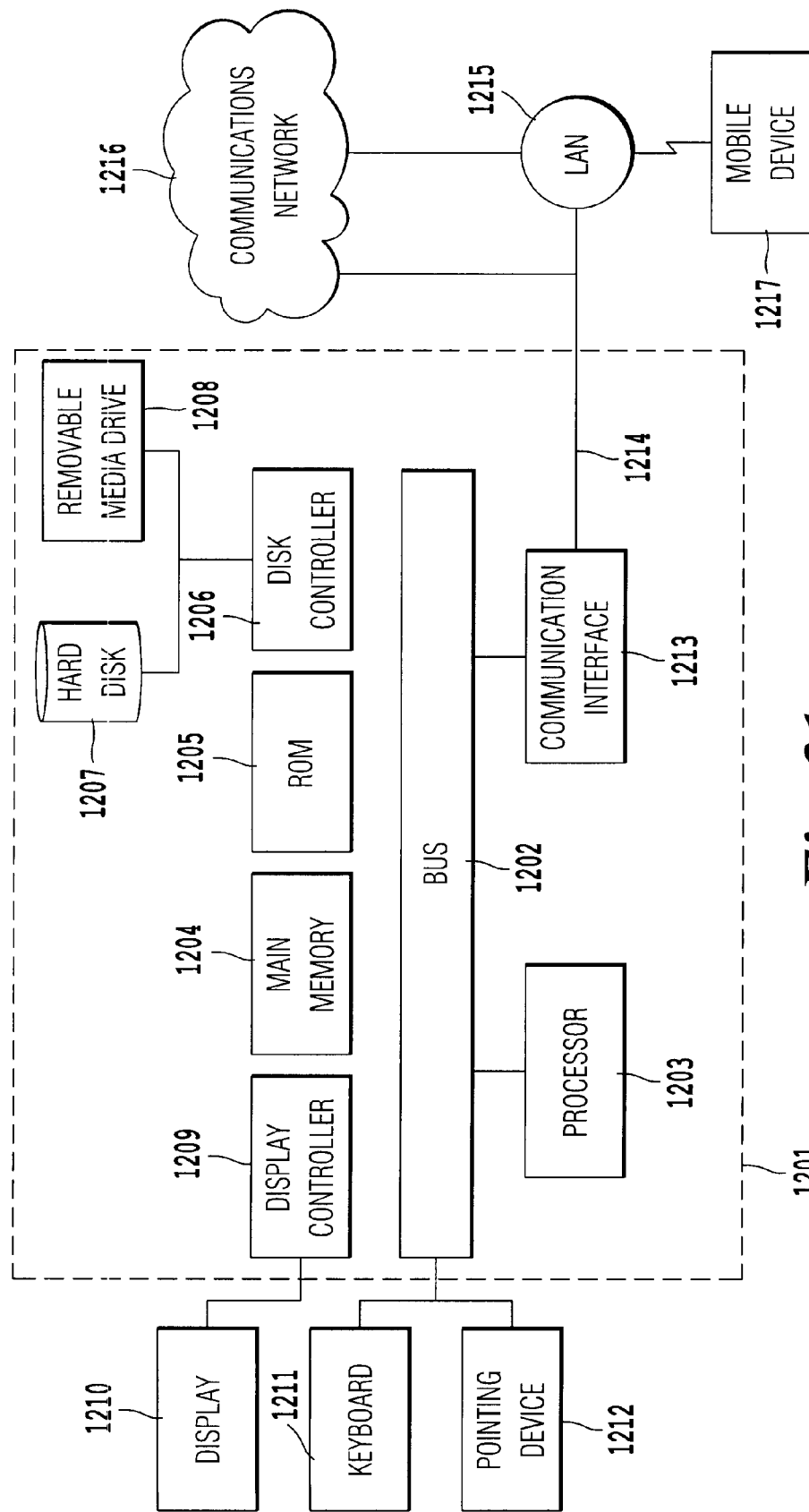
FIG. 31 is an exemplary computer system and information distribution environment on which the invention may be carried out.

FIG. 31 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

One or ordinary skill in the art will appreciate that numerous modifications and variations of the present invention are possible in light of the above teachings. The above described embodiments discuss the application of the present invention to sharing the risk of loan defaults with a mortgage insurer. However, this is only one non-limiting embodiment of the invention. The present invention is equally applicable to any situation where detailed information about the decision steps of a programming logic set is needed. It is therefore to be understood that within the scope of the appended claims, the invention may be practiced otherwise than as specifically described herein.

The invention claimed is:

1. A method for determining all decision steps of a programming logic set executed by a computer, the method comprising:
   receiving one or more data sets through a communication interface of the computer;
   storing the one or more data sets in a storage unit;
   receiving conditional information through the communication interface of the computer;
   storing the conditional information in the storage unit; and
   tagging, by a processor, one of said one or more data sets to indicate qualification under the conditional information, wherein the tagging includes
      determining, by the processor, if each tagging condition element passes or fails,
      wherein a tagging condition element indicates a condition that a data set must satisfy for the tagging condition element to be given a pass,
      combining, by the processor, in accordance with a predefined logic scheme, the results of individual tagging condition elements from the determining step to further determine whether said one or more data sets meet the conditional information, and
      storing results of the tagging step in the storage unit.

2. The method of claim 1, further comprising a:
   displaying, via a display apparatus, in a first user interface the data representative of the conditional information.

3. The method of claim 1, wherein data representative of the conditional information is expressed as one or more logical constraints including an AND-group, an OR-group within the AND-group, and an individual condition within the OR-group, and
   said tagging further comprises steps of:
      determining, with the processor, whether each OR-group passes or fails based on results of the determining if the tagging condition element passes or fails; and
      determining, with the processor, whether each AND-group passes or fails based on results of the OR-group determination.

4. The method of claim 3, further comprising displaying, via a display apparatus, results of the tagging.

5. The method of claim 1, further comprising:
   displaying, via a display apparatus, what one or more conditions prevented any data set from being tagged, in response to a query.

6. The method of claim 1, further comprising repeating, with the processor, said tagging for each of said one or more data sets.

7. The method of claim 4, wherein displaying results of the tagging further comprises displaying, via the display apparatus, a table that includes a total number of tagged data sets and a total number of data sets that were not tagged.

8. The method of claim 4, further comprising:
   selecting, with an input device, a data set that was not tagged from the displayed result;
   displaying, via the display apparatus, a second user interface which displays the conditional information in a second table, the second table including the tagging condition elements and a value of the data set that is compared, by the processor, to the conditional information; and
   identifying, by the processor, the AND-groups, OR-groups, and individual conditions that passed and failed the logical constraint of the conditional information.

9. The method of claim 8, further comprising:
   selecting, with the input device, a first tagging condition element that failed, in the second table; and
   displaying, via the display apparatus, a third user interface which displays a total number of data sets that failed the selected first tagging condition element.

10. The method of claim 8, further comprising:
   selecting, with the input device, a second tagging condition element that failed, in the second table; and displaying, via the display apparatus, a fourth user interface which displays the total number of data sets that failed the first and second selected tagging condition elements.

11. The method of claim 2, further comprising:
selecting, with the input device, a first tagging condition element from the first user interface;
identifying, by the processor, one or more data sets that satisfy the selected first tagging condition element;
redisplaying, via the display apparatus, the first user interface, wherein the redisplayed first user interface identifies the selected tagging condition element, and tagging is performed, by the processor, on the identified data sets.

12. The method of claim 11, further comprising:
displaying, via the display apparatus, a total number of the data sets received and a total number of the data sets that satisfy the selected first tagging condition element.

13. The method of claim 12, further comprising:
selecting, with the input device, a second tagging condition element from the first user interface, wherein identifying includes identifying data sets that satisfy the selected first and second tagging condition elements.

14. The method of claim 1, wherein the data set is representative of a loan document and the conditional information is representative of one or more requirements of a mortgage insurer sharing risk associated with a default of the loan of the loan document.

15. The method of claim 14, wherein a tagged loan corresponds to a loan eligible to be insured by an insurer.

16. The method of claim 14, wherein the first tagging condition element is a provision of the loan which relates to the requirements of the mortgage insurer.

17. A computer-implemented method for determining whether one or more loans meets one or more requirements of an agreement, the method comprising:
receiving one or more data sets representative of the one or more loans through a communication interface of the computer;
storing the one or more data sets in a storage unit;
receiving, via the communication interface of the computer, data representative of one or more conditions that must be satisfied by a given loan in order for the loan to qualify under requirements of the agreement;
storing the one or more conditions in the storage unit;
tagging, by a processor, one of said one or more loans to indicate qualification under the requirements of the agreement, wherein the tagging includes
determining, by the processor, if each tagging condition element passes or fails,
wherein a tagging condition element indicates a condition a data set must satisfy for the tagging condition element to be given a pass; and
combining, by the processor, in accordance with a pre-defined logic scheme, the results of individual tagging condition elements from the determining to further determine whether said loan meets the conditions for qualification under the requirements of the agreement; and
storing results of the tagging step in the storage unit.

18. The method of claim 17, further comprising: displaying, via a display apparatus, in a first user interface the data representative of the one or more conditions.

19. The method of claim 17, wherein data representative of the one or more conditions is expressed as one or more logical constraints including an AND-group, an OR-group within the AND-group, and an individual condition within the OR-group, and
said tagging further comprises steps of:
determining, with the processor, whether each OR-group passes or fails based on results of the determining if the tagging condition element passes or fails, and
determining, with the processor, whether each AND-group passes or fails based on results of the OR-group determination.

20. The method of claim 19, further comprising displaying, via a display apparatus, results of the tagging.

21. The method of claim 17, further comprising:
displaying, via a display apparatus, what one or more conditions prevented any data set from being tagged, in response to a query.

22. The method of claim 17, further comprising: repeating, with the processor, said tagging for each of said one or more data sets.

23. The method of claim 18, wherein displaying results of the tagging further comprises displaying, via the display apparatus, a table that includes a total number of the loans that were tagged and a total number of the loans that were not tagged, the loans that were tagged corresponding to loans eligible for risk sharing with the party to the agreement.

24. The method of claim 20, further comprising:
selecting, with an input device, a loan that was not tagged from the displayed result;
displaying, via the display apparatus, a second user interface which displays the conditions in a second table, the second table including the tagging condition elements and a provision of the loan that is compared, by the processor, to the conditions; and
identifying, by the processor, the AND-groups, OR-groups, and tagging condition elements that passed and failed the conditions.

25. The method of claim 24, further comprising:
selecting, with the input device, from the second user interface, a first tagging condition element indicated as failed; and
displaying, via the display apparatus, a third user interface which displays a total number of loans that failed the selected first tagging condition element.

26. The method of claim 24, further comprising:
selecting, with the input device, from the second user interface, a second tagging condition element indicated as failed; and
displaying, via the display apparatus, a fourth user interface which displays a total number of loans that failed the first and second selected tagging condition elements.

27. The method of claim 18, further comprising:
selecting, with an input device, a first tagging condition element from the first user interface;
identifying, by the processor, one or more loans that satisfy the selected first tagging condition element; and
redisplaying, via the display apparatus, the first user interface,
wherein the redisplayed first user interface identifies the selected first tagging condition element, and tagging is performed, by the processor, on the identified loans.

28. The method of claim 26, further comprising: displaying, via the display apparatus, a total number of the loans received and a total number of the data sets that satisfy the selected first tagging condition element.

29. The method of claim 26, further comprising: selecting, with the input device, a second tagging condition element, wherein the identifying includes subdividing the loans by selecting only loans that satisfy the selected first and second tagging condition elements.

30. A system for implementing a method for displaying results of an analysis that determines whether a loan meets one or more requirements of an agreement, the system comprising:
   means for receiving at least one data set;
   a memory device for storing the at least one data set;
   means for receiving conditional information;
   the memory device storing the conditional information; and
   means for tagging one of said one or more data sets to indicate qualification under the conditional information;
   a processor for determining if each tagging condition element passes or fails;
   wherein a tagging condition element indicates a condition that a data set must satisfy for the tagging condition element to be given a pass,
   means for combining, in accordance with a predefined logic scheme, the results of individual tagging condition elements from the processor to further determine whether said data set meets the conditional information, and
   the memory device storing results of the tagging in the system.

31. The system of claim 30, further comprising:
   means for displaying, in response to a query, what one or more conditions prevented any data set from being tagged.

32. The system of claim 30, wherein the data representative of the conditional information is expressed as one or more logical constraints including an AND-group, an OR-group within the AND-group, and an individual condition within the OR-group, and
   said system further comprises:
   means for determining whether each OR-group passes or fails based on results of the determining means, and for determining whether each AND-group passes or fails based on results of the OR-group determination.

33. A computer-readable storage medium encoded with instructions, which when executed by a processor, causes the processor to perform a method for determining one or more decision steps of a programming logic set, the method comprising:
   receiving one or more data sets through a communication interface of the computer;
   storing the one or more data sets in a storage unit; and
   receiving conditional information through the communication interface of the computer;
   storing the conditional information in the storage unit; and
   tagging, by a processor, one of said one or more data sets to indicate qualification under the conditional information, wherein the tagging includes
      determining, by the processor, if each tagging condition element passes or fails,
      wherein a tagging condition element indicates a condition that a data set must satisfy for the tagging condition element to be given a pass,
      combining, by the processor, in accordance with a predefined logic scheme, the results of individual tagging condition elements from the determining step to further determine whether said one or more data sets meet the conditional information, and
      storing results of the tagging step in the storage unit.

34. The computer readable storage medium of claim 33, wherein the method further comprises:
   displaying, via a display apparatus, in a first user interface the data representative of the conditional information.

35. The computer readable storage medium of claim 33, wherein data representative of the conditional information is expressed as one or more logical constraints including an AND-group, an OR-group within the AND-group, and an individual condition within the OR-group, and
   said tagging further comprises steps of:
   determining, with the processor, whether each OR-group passes or fails based on results of the determining if the tagging condition element passes or fails; and
   determining, with the processor, whether each AND-group passes or fails based on results of the OR-group determination.

36. The computer readable storage medium of claim 35, wherein the method further comprises displaying, via a display apparatus, results of the tagging.

37. The computer readable storage medium of claim 33, wherein the method further comprises:
   displaying, via a display apparatus, what one or more conditions prevented any data set from being tagged, in response to a query.

38. The computer readable storage medium of claim 33, wherein the method further comprises repeating, with the processor, said tagging for each of said one or more data sets.

39. The computer readable storage medium of claim 36, wherein the displaying results of the tagging further comprises displaying, via the display apparatus, a table that includes a total number of tagged data sets and a total number of data sets that were not tagged.

40. The computer readable storage medium of claim 36, wherein the method further comprises:
   selecting, with an input device, a data set that was not tagged from the displayed result;
   displaying, via the display apparatus, a second user interface which displays the conditional information in a second table, the second table including the tagging condition elements and a value of the data set that is compared, by the processor, to the conditional information; and
   identifying, by the processor, the AND-groups, OR-groups, and individual conditions that passed and failed the logical constraint of the conditional information.

41. The computer readable storage medium of claim 40, wherein the method further comprises:
   selecting, with the input device, a first tagging condition element that failed, in the second table; and
   displaying, via the display apparatus, a third user interface which displays a total number of data sets that failed the selected first tagging condition element.

42. The computer readable storage medium of claim 40, wherein the method further comprises:
   selecting, with the input device, a second tagging condition element that failed, in the second table; and
   displaying, via the display apparatus, a fourth user interface which displays the total number of data sets that failed the first and second selected tagging condition elements.

43. The computer readable storage medium of claim 34, wherein the method further comprises:
   selecting, with an input device, a first tagging condition element from the first user interface;
   identifying, by the processor, one or more data sets that satisfy the selected first tagging condition element;
   redisplaying, via the display apparatus, the first user interface, wherein the redisplayed first user interface identifies the selected tagging condition element, and tagging is performed, by the processor, on the identified data sets.

44. The computer readable storage medium of claim 43, wherein the method further comprises:

displaying, via the display apparatus, a total number of the data sets received and a total number of the data sets that satisfy the selected first tagging condition element.

45. The computer readable storage medium of claim 44, wherein the method further comprises:

selecting, with the input device, a second tagging condition element from the first user interface, wherein the identifying includes identifying data sets that satisfy the selected first and second tagging condition elements.

46. The computer readable storage medium of claim 33, wherein the data set is representative of a loan document and the conditional information is representative of one or more requirements of a mortgage insurer sharing risk associated with a default of the loan of the loan document.

47. The computer readable storage medium of claim 46, wherein a tagged loan corresponds to a loan eligible to be insured by an insurer.

48. The computer readable storage medium of claim 46, wherein the first tagging condition element is a provision of the loan which relates to the requirements of the mortgage insurer.

49. A system for implementing a method for displaying results of an analysis that determines whether a loan meets one or more requirements of an agreement, the system comprising:

a receiving unit configured to receive at least one data set and conditional information;

a memory device configured to store the at least one data set and conditional information;

a tagging unit configured to tag one of said one or more data sets to indicate qualification under the conditional information;

a processor configured to determine if each tagging condition element passes or fails, wherein a tagging condition element indicates a condition that the data set must satisfy for the tagging condition element to be given a pass;

a combining unit configured to combine, in accordance with a predefined logic scheme, results of individual tagging condition elements from the processor to further determine whether said data set meets the conditional information; and the memory device being configured to store results of the tagging in the system.

50. The system of claim 49, wherein the data set is representative of a loan document and the conditional information is representative of one or more requirements of a mortgage insurer sharing risk associated with a default of the loan of the loan document.

51. The system of claim 50, wherein a tagged loan corresponds to a loan eligible to be insured by an insurer.

52. The system of claim 50, wherein the first tagging condition element is a provision of the loan which relates to the requirements of the mortgage insurer.

\* \* \* \* \*